United States Patent [19]

Ordish

[11] Patent Number: 5,034,916
[45] Date of Patent: Jul. 23, 1991

[54] FAST CONTACT CONVERSATIONAL VIDEO SYSTEM

[75] Inventor: Christopher J. Ordish, Virginia Water, United Kingdom

[73] Assignee: Reuters Limited, England

[21] Appl. No.: 261,578

[22] Filed: Oct. 24, 1988

[51] Int. Cl.⁵ .............................................. G06F 3/14
[52] U.S. Cl. ..................................... 364/900; 379/95;
379/96; 364/918.8; 364/927.6; 364/927.64;
364/927.96; 364/929; 364/929.12; 364/935.2;
364/942.06; 364/974.2; 364/976.1; 364/976.2;
364/222.2; 364/222.3; 364/228.3; 364/234;
364/234.2; 364/237.2; 364/237.3; 364/238.5;
364/263; 364/284; 364/284.3; 364/284.4
[58] Field of Search ................ 364/200, 900; 379/354, 379/355, 368, 96, 95

[56] References Cited

U.S. PATENT DOCUMENTS

| | | | |
|---|---|---|---|
| 4,431,870 | 2/1984 | May et al. | 379/354 |
| 4,506,111 | 3/1985 | Takenouchi et al. | 379/95 |
| 4,525,779 | 6/1985 | Davids et al. | 364/200 |
| 4,531,184 | 7/1985 | Wigan et al. | 364/200 |
| 4,640,989 | 2/1987 | Riner et al. | 379/96 |
| 4,689,761 | 8/1987 | Yurehenco | 364/900 |
| 4,825,461 | 4/1989 | Kurita et al. | 379/355 |
| 4,885,580 | 12/1989 | Noto et al. | 379/354 |
| 4,901,223 | 2/1990 | Rhyne | 379/95 |
| 4,908,853 | 3/1990 | Matsumoto | 379/354 |

Primary Examiner—Michael R. Fleming
Assistant Examiner—Ayaz R. Sheikh
Attorney, Agent, or Firm—Bryan, Cave, McPheeters & McRoberts

[57] ABSTRACT

An improved system (30) provides fast contact in a conversational video system by use of a screen pointer (200) in connection with a windowed display of a financial data page and a unique subscriber identification code with or without an interest message code. When an interest message code is provided, the prestored interest message is expanded and inserted in the command line. If a double click is employed with the mouse 200 screen pointer, contact is automatically initiated with the called party and the interest message transmitted. However, if only a single click is detected, the interest message is inserted in the command line without being automatically transmitted. The subscriber may then double click his mouse screen pointer (200) at the location of the code in the display (76) or may press the TRANSMIT key on the keyboard (72) to send the interest message to the called party. The system (30) may also use CONTACT LISTS to initiate conversational contacts.

21 Claims, 22 Drawing Sheets

OVERALL SYSTEM

CENTRAL SYSTEM NETWORK

FIG. 4

| MENU SCREENS PROMPTS | | CALLS | 0/0 |
|---|---|---|---|
| NO CURRENT CONVERSATIONS | | | HELP |

MON VIEW FXFX                                                           CNV NOT READY

| CCY | DEAL | NAME | * | REUTER | SPOT RATES | * | PREV | HI*EURO* | LO FXFX |
|---|---|---|---|---|---|---|---|---|---|
| 1035 DEM | KIBU*D | K.I.B | | ASD | 1.6985/95 | | 85/95 | 1.7038 | 1.6760 |
| 1035 DEM | WMCA*G | NATWEST | | LDN | 1.7525/45 | | 25/40 | 1.7566 | 1.7505 |
| 1035 GBP | WMCC*C | NATWEST | | LDN | 1.3955/65 | | 65/80 | 1.3965 | 1.3822 |
| 1035 CHF | WMCH*J | NATWEST | | LDN | 129.75/85 | | 80/90 | 130.95 | 129.15 |
| 1035 JPY | BFPX*F | B FRANCO | | PAR | 5.7420/50 | | 30/60 | 5.7525 | 5.7230 |
| 1034 FRF | AMRR*N | AMRO BK | | RTD | 1.9075/85 | | 00/50 | 1.9110 | 1.9000 |
| 1035 NLG | BCIX*I | B.C.I. | | MIL | 1252.25/2.75 | | 75/50 | 1254.50 | 1247.00 |
| 1035 ITL | PRBX*X | PRIVAT | | COP | 1.2145/50 | | 35/40 | 1.2262 | 1.2135 |
| 1034 XEU | | | | | | | | | |

| XAU PBUK | 430.00 / 430.50 | * | ED3 | 8.50/8.62 | * | FED | PREB * LFDA DEC |

FIG. 5

| MENU | SCREENS | PROMPTS | | | | | CALLS | 0/0 HELP |
|---|---|---|---|---|---|---|---|---|

NO CURRENT CONVERSATIONS

CNV CNTCT KIBU SPOT DEM PSE □     CNV READY

| | CCY | DEAL | NAME | REUTER | SPOT RATES | * | PREV | HI*EURO* | LO FXFX |
|---|---|---|---|---|---|---|---|---|---|
| 1035 | DEM | KIBU*D | KIB | ASD | 1.6985/95 | | 85/95 | 1.7035 | 1.6760 |
| 1035 | GBP | WMCA*G | NATWEST | LDN | 1.7325/45 | | 25/40 | 1.7566 | 1.7505 |
| 1035 | CHF | WMCC*C | NATWEST | LDN | 1.3955/65 | | 65/80 | 1.3965 | 1.3822 |
| 1035 | JPY | WMCH*J | NATWEST | LDN | 129.75/85 | | 80/90 | 130.95 | 129.15 |
| 1034 | FRF | BFPX*F | B FRANCO | PAR | 5.7420/50 | | 30/60 | 5.7525 | 5.7230 |
| 1035 | NLG | AMRR*N | AMRO BK | RTD | 1.9075/85 | | 00/50 | 1.9110 | 1.9000 |
| 1035 | ITL | BCIX*I | B.C.I. | MIL | 1252.25/2.75 | | 75/50 | 1254.50 | 1247.00 |
| 1034 | XEU | PRBX*X | PRIVAT | COP | 1.2145/50 | | 35/40 | 1.2262 | 1.2135 |

XAU PBUK 430.00 / 430.50 * ED3   8.50/8.62 * FED   PREB * LFDA DEC

FIG. 6A

| | MENU SCREENS PROMPTS | | | | | | HELP |
|---|---|---|---|---|---|---|---|
| TO KIBU | | 2359GMT | QUEUED | | | CALLS | 0/0 |
| # SPOT DEM PSE | | | | | | | |

| CNI | | | | | | CNV READY | |
|---|---|---|---|---|---|---|---|
| | CCY | DEAL | NAME * | REUTER | SPOT RATES * | PREV | HI*EURO*LO FXFX |
| 1035 | DEM | KIBU*D | KIB | ASD | 1.6985/95 | 85/95 | 1.7035 1.6760 |
| 1035 | GBP | WMCA*G | NATWEST | LDN | 1.7525/45 | 25/40 | 1.7566 1.7505 |
| 1035 | CHF | WMCC*C | NATWEST | LDN | 1.3955/65 | 65/80 | 1.3965 1.3822 |
| 1035 | JPY | WMCH*J | NATWEST | LDN | 129.75/85 | 80/90 | 130.95 129.15 |
| 1034 | FRF | BFPX*F | B FRANCO | PAR | 5.7420/30 | 30/60 | 5.7525 5.7230 |
| 1035 | NLG | AMRR*N | AMRO BK | RTD | 1.9075/85 | 00/50 | 1.9110 1.9000 |
| 1035 | ITL | BCIX*I | B.C.I. | MIL | 1252.25/2.75 | 75/50 | 1254.50 1247.00 |
| 1034 | XEU | PRBX*X | PRIVAT | COP | 1.2145/50 | 35/40 | 1.2262 1.2135 |
| XAU | PBUK | 430.00 / 43050 | * | ED3 | 8.50/8.62 | * FED | PREB * LFDA DEC |

| | | MENU SCREENS PROMPTS | | | | CALLS | | HELP |
|---|---|---|---|---|---|---|---|---|
| | | NO CURRENT CONVERSATIONS | | | | | | 0/0 |

MON VIEW FXFX                      CNV READY

| | CCY | DEAL | NAME | * | REUTER | SPOT RATES | * | PREV | HI | * | EURO | * | LO | FXFX |
|---|---|---|---|---|---|---|---|---|---|---|---|---|---|---|
| 1035 | DEM | KIBU*D | K.I.B | | ASD | 1.6985/95 | | 85/95 | 1.7045 | | | | 1.6760 | |
| 1035 | GBP | WMCA*G | NATWEST | | LDN | 1.7525/45 | | 25/40 | 1.7566 | | | | 1.7505 | |
| 1035 | CHF | WMCC*C | NATWEST | | LDN | 1.3955/65 | | 65/80 | 1.3965 | | | | 1.3822 | |
| 1035 | JPY | WMCH*J | NATWEST | | LDN | 129.75/85 | | 80/90 | 130.95 | | | | 129.15 | |
| 1034 | FRF | BFPX*F | B FRANCO | | PAR | 5.7420/50 | | 30/60 | 5.7525 | | | | 5.7230 | |
| 1035 | NLG | AMRR*N | AMRO BK | | RTD | 1.9075/85 | | 00/50 | 1.9110 | | | | 1.9000 | |
| 1035 | ITL | BCIX*I | B.C.I. | | MIL | 1252.25/2.75 | | 75/50 | 1254.50 | | | | 1247.00 | |
| 1034 | XEU | PRBX*X | PRIVAT | | COP | 1.2145/50 | | 35/40 | 1.2262 | | | | 1.2135 | |

| XAU | PBUK | 430.00 / 430.50 | * | ED3 | 8.50/8.62 | * | FED | PREB | * | LFDA DEC |
|---|---|---|---|---|---|---|---|---|---|---|

FIG. 8

| CNV CNTCT KIBU | | MENU SCREENS PROMPTS | | | CALLS 0/0 |
|---|---|---|---|---|---|
| | | NO CURRENT CONVERSATIONS | | | HELP |

| CCY | DEAL | NAME | * | REUTER | SPOT RATES | * | PREV | HI*EURO*LO | FXFX |
|---|---|---|---|---|---|---|---|---|---|
| DEM | KIBU*D | KIB | | ASD | 1.6985/95 | | 85/95 | 1.7035 | 1.6760 |
| GBP | WMCA**G | NATWEST | | LDN | 1.7525/45 | | 25/40 | 1.7566 | 1.7505 |
| CHF | WMCC*C | NATWEST | | LDN | 1.3955/65 | | 65/80 | 1.3965 | 1.3822 |
| JPY | WMCH**J | NATWEST | | LDN | 129.75/85 | | 80/90 | 130.95 | 129.15 |
| FRF | BFPX*F | B FRANCO | | PAR | 5.7420/50 | | 30/60 | 5.7525 | 5.7230 |
| NLG | AMRR*N | AMRO BK | | RTD | 1.9075/85 | | 00/50 | 1.9110 | 1.9000 |
| ITL | BCIX*I | B.C.I. | | MIL | 1252.25/2.75 | | 75/50 | 1254.50 | 1247.00 |
| XEU | PRBX*X | PRIVAT | | COP | 1.2145/50 | | 35/40 | 1.2262 | 1.2135 |

XAU PBUK  430.00 / 430.50  *  ED3  8.50/8.62  *  FED  PREB * LFDA DEC

CNV READY

FIG. 9A

| MENU SCREENS PROMPTS | | | | | | | CALLS | HELP |
|---|---|---|---|---|---|---|---|---|
| TO KIBU | | | 2359GMT QUEUED | | | | 0/0 | |

CN1

| | CCY | DEAL | NAME | REUTER | SPOT RATES | * | PREV | HI*EURO*LO FXFX |
|---|---|---|---|---|---|---|---|---|
| 1035 | DEM | KIBU*D | K I B | ASD | 1.6985/95 | | 85/95 | 7035 1.6760 |
| 1035 | GBP | WMCA*G | NATWEST | LDN | 1.7525/45 | | 25/40 | 1.7566 1.7505 |
| 1035 | CHF | WMCC*C | NATWEST | LDN | 1.3955/65 | | 65/80 | 1.3963 1.3822 |
| 1035 | JPY | WMCH*J | NATWEST | LDN | 129.75/85 | | 80/90 | 130.95 129.15 |
| 1034 | FRF | BFPX*F | B FRANCO | PAR | 5.7420/50 | | 30/60 | 5.7525 5.7230 |
| 035 | NLG | AMRR*N | AMRO BK | RTD | 1.9075/85 | | 00/50 | 1.9110 1.9000 |
| 1035 | ITL | BCIX*I | B.C.I. | MIL | 1252.25/2.75 | | 75/50 | 1254.50 1247.00 |
| 1034 | XEU | PRBX*X | PRIVAT | COP | 1.2145/50 | | 35/40 | 1.2262 1.2135 |

XAU PBUK 430.00 / 430.50 * ED3 8.50/8.62 * FED PREB * LFDA DEC

CNV READY

DATA DISPLAY APPLICATION

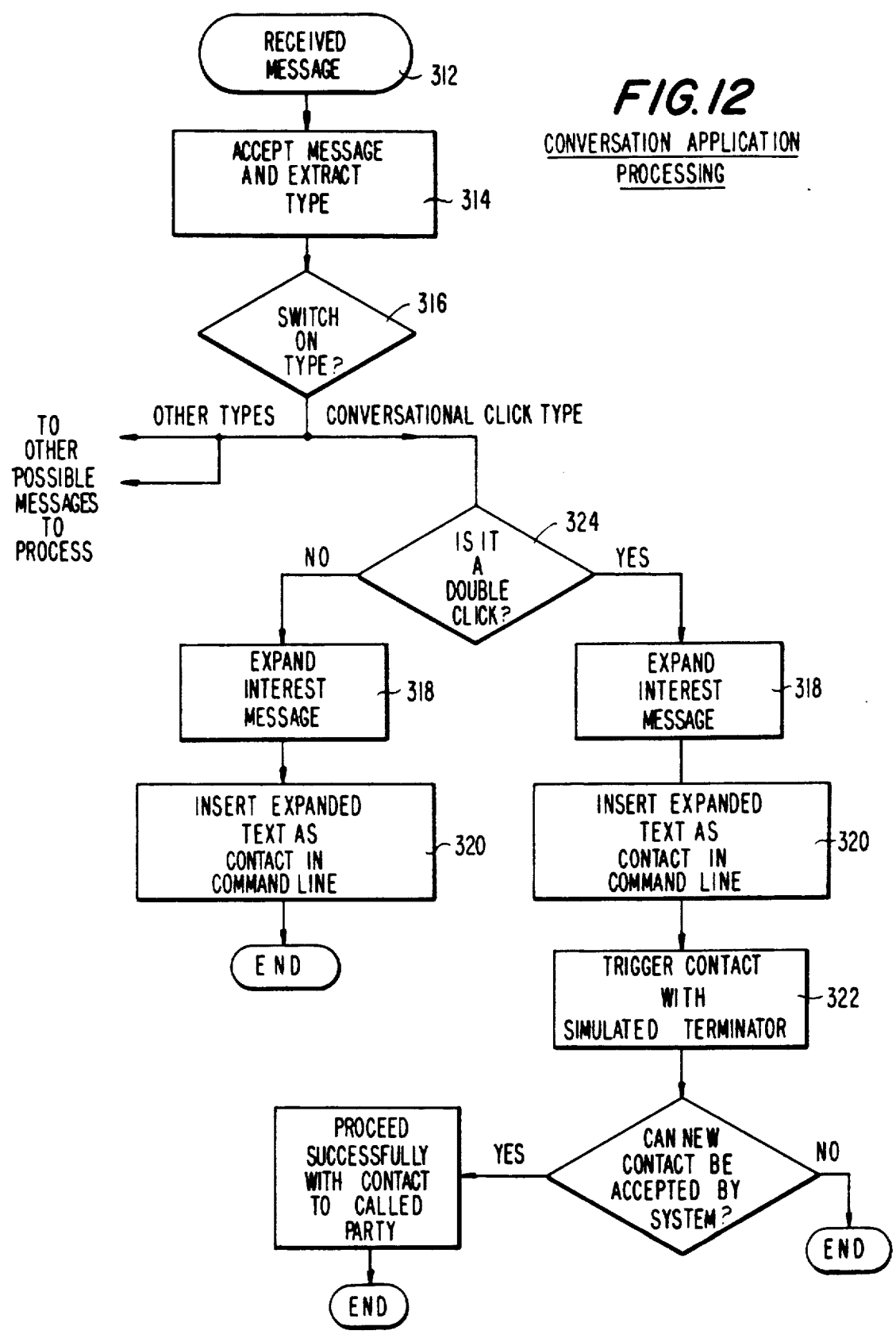

5,034,916

FAST CONTACT CONVERSATIONAL VIDEO SYSTEM

CROSS REFERENCE TO RELATED APPLICATIONS

This application is related to and an improvement on commonly owned U.S. Pat. No. 4,531,184, entitled "Conversational Video System Having Contact Selection Control", issued July 23, 1985, naming Jack S. Wigan, David G. Ure and John M. Richards as joint inventors thereof, the contents of which is specifically incorporated by reference herein in its entirety, and U.S. Pat. No. 4,525,779, entitled "Conversational Video System", issued June 25, 1985, naming Martin Davids, Peter Blackman and Lily Teo as joint inventors thereof.

TECHNICAL FIELD

The present invention relates to two-way video communication systems and particularly to such systems capable of providing subscriber to subscriber video data communication in a conversational mode.

BACKGROUND ART

Communication systems for transmitting data point to point are well known, such as conventional telex systems and data base access systems. In addition, of course, telephone systems are well known two-way conversational communication media with the disadvantage being that a telephone system does not provide any hard copy nor does it allow you to, on the same device, obtain supplementary data while carrying on the conversation. Such supplementary data may be particularly important if the purpose of the conversation is commodity dealing such as in the money market. With respect to the telex communication, apart from its associated rate of speed, it does not enable you to readily carry on two different two-way telex communications alternatively so that you can carry on "telex conversations" with two different subscribers at substantially the same time. Moreover, neither the telex communication systems nor telephone communication systems provide a listing of incoming callers prior to acceptance of the message by the recipient. With respect to two-way data-base access systems, such prior art systems do not in reality provide a real time conversational communication in that they merely provide for remote storage of information which may subsequently be retrieved upon request by a subscriber or, in certain instances, can be provided to the subscriber if he is accessing the particular storage location to which the data is being provided. However, this is still not a real-time conversation type of video communication system in which a pair of subscribers or users can interact in real time in a conversational mode. With respect to prior art telephone and data-base access systems, a prior art system merging these two technologies is known as the Delphi system which is a telephone message management system in which speech messages may be prerecorded and stored in a data base for subsequent automatic transmission to incoming callers and in which incoming messages may be stored for subsequent later transmission to proscribed recipients. However, this system is not a true conversational video communication system nor does it enable a particular user to carry on multiple conversations substantially simultaneously. These disadvantages were overcome by the interactive conversational video systems described in the aforementioned commonly owned U.S. Pat. Nos. 4,531,184 and 4,525,779, incorporated by reference herein, which systems are capable of providing interactive conversational type of video communication between pairs of uses or subscribers, as well as enabling multiPle conversations to be carried out by a given user or subscriber in real-time and in association with data-base retrieval of supplementary data, such as in the commercially available Reuters Dealing System employed for commodity dealing such as in the money market. In such systems, such as in the money market, speed of contact is important in initiating and making deals usually involving substantial sums of money where slight delays can result either in a lost deal or a substantial variation in exchange rate. Thus, although the use of a keyboard to manually type in contacts to be made is often satisfactory, there are many instances when such manually initiated contact is not fast enough in the rapidly paced foreign exchange market, such as when important new financial information which could affect a trade or deal is being displayed to the subscriber, such as via a Reuters Monitor page. The present invention is an improvement on the previously described systems contained in the aforementioned U.S. Pat. Nos. 4,531184 and 4,525,779 so as to enable faster contact to be achieved when needed by the subscriber who can, thus, using the present invention, automatically initiate contact via the use of a pointer on the screen displaying the financial data.

DISCLOSURE OF THE INVENTION

In an improved video communication network capable of Providing textual data messages to a plurality of subscriber terminals throughout the network, each of the subscriber keystations comprises a video display for providing a windowed textual video display of data input to the network and a pointer means, such as a mouse, for locating data display areas in the windowed textual video display. Each group of up to twelve subscriber keystations has a unique associated identification code, with the network including a message switching interface capable of retrievably storing a plurality of unique subscriber keystation contact signals capable of initiating conversational contact with at least one other subscriber keystation in the network. The windowed textual video display comprises a windowed display of at least one of the unique associated identification codes and the pointer means comprises means capable of locating the windowed display of the unique associated identification code in the windowed textual video display and providing a conversational contact message signal to message routing logic in the network which responds to the provided conversational contact message signal to retrieve the corresponding unique subscriber keystation contact signal and provide a calling signal to the corresponding keystation to automatically initiate conversational contact therewith.

The windowed textual video display may comprise financial data. In addition, the displayed identification code may further comprise a windowed display of a selected one of a plurality of interest message codes, each corresponding to a retrievably stored interest message, which may then automatically be provided to the called keystation along with the calling signal when conversational contact has been automatically initiated. If desired, this fast conversational contact approach can be used in addition to or as an adjunct to the previously employed apprOaCh uSing a keyboard for manual input of the conversational contacts and interest messages and the use of prestored contact lists or contact lists which are created as part of the set-up of the call.

BRIEF DESCRIPTION OF DRAWINGS

FIG. 4 is a diagrammatic illustration of a typical sample financial data page video display such as a Reuter Monitor page FXFX, containing a windowed textual video display and a windowed display of a unique subscriber identification code and interest message code which may appear on the display portion of a typical subscriber keystation used in the system of FIG. 1 prior to automatically initiating contact using a screen pointer in accordance with the present invention;

FIG. 5 is a diagrammatic illustration of the video display of FIG. 4 after a single click on the mouse in accordance with the present invention;

FIG. 6A is a diagrammatic illustration of the video display of FIG. 4 after a double click on the mouse or a single click and a transmit code in accordance with the present invention;

FIG. 6C is a diagrammatic illustration of the video display after the call has been accepted by the called party;

FIG. 7 is a diagrammatic illustration, similar to FIG. 4, of a typical sample financial data page video display, such as a Reuter Monitor page FXFX, containing a windowed textual video display and a windowed display of a unique subscriber identification code, without any interest message code, which may appear on the display portion of a typical subscriber keystation used in the system of FIG. 1 prior to automatically initiating contact utilizing a screen pointer in accordance with the present invention;

FIG. 8 is a diagrammatic illustration, similar to FIG. 5, of the video display of FIG. 7 after a single click on the mouse in accordance with the present invention;

FIG. 9A is a diagrammatic illustration, similar to FIG. 6A of the video display of FIG. 7 after a double click on the mouse or a single click and a transmit code in accordance with the present invention;

FIG. 12 is a logic flow diagram of the conversation application processing of the conversational contact message initiated in accordance with FIG. 11 for expanding the contact message and establishing conversational contact in accordance with the present invention;

BEST MODE FOR CARRYING OUT THE INVENTION

Figure 1:
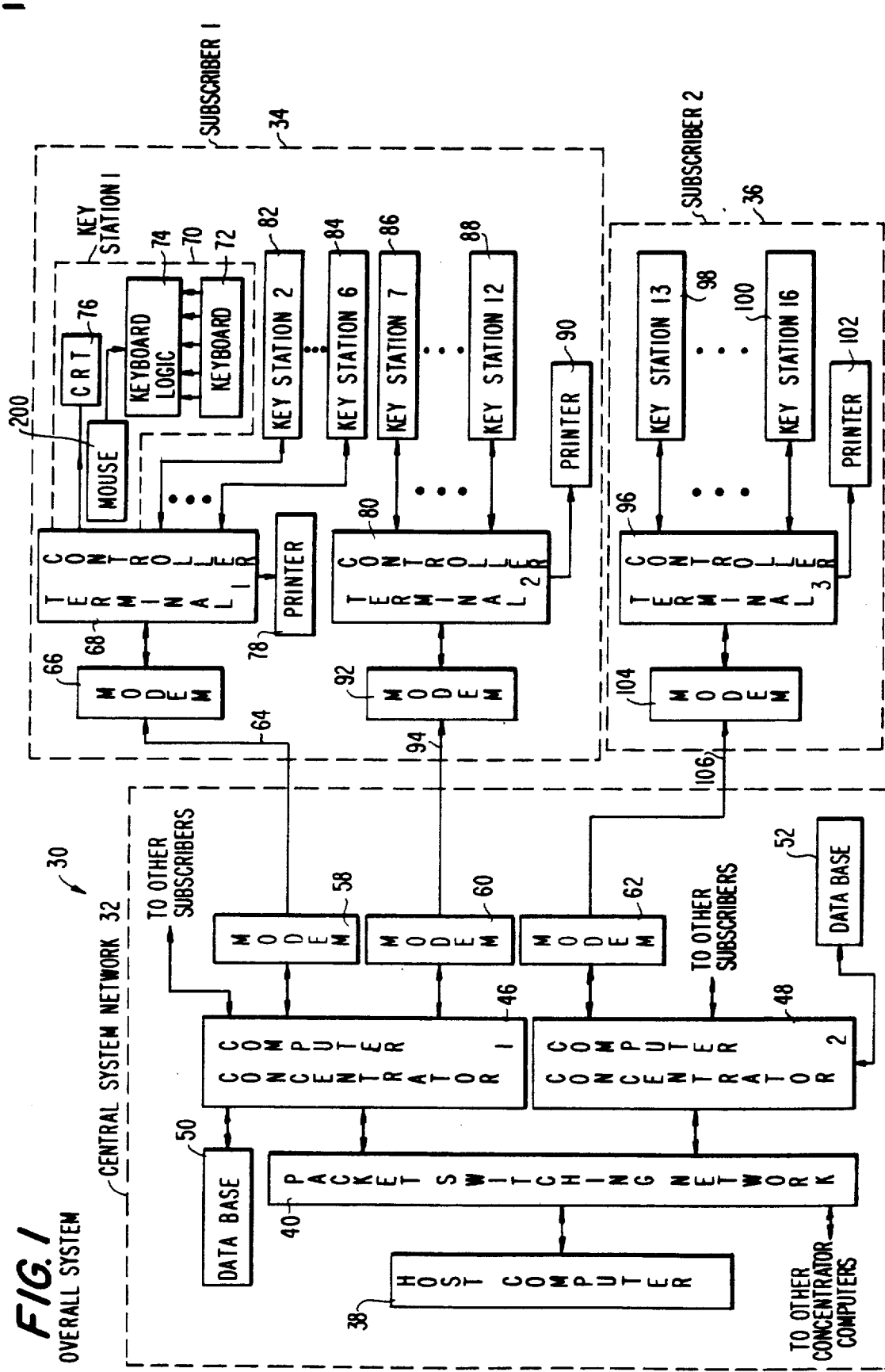
FIG. 1 is an overall system functional block diagram of the conversational video system of commonly owned U.S. Pat. No. 4,531,184 modified in accordance with the improvement of the present invention.
Figure 2:
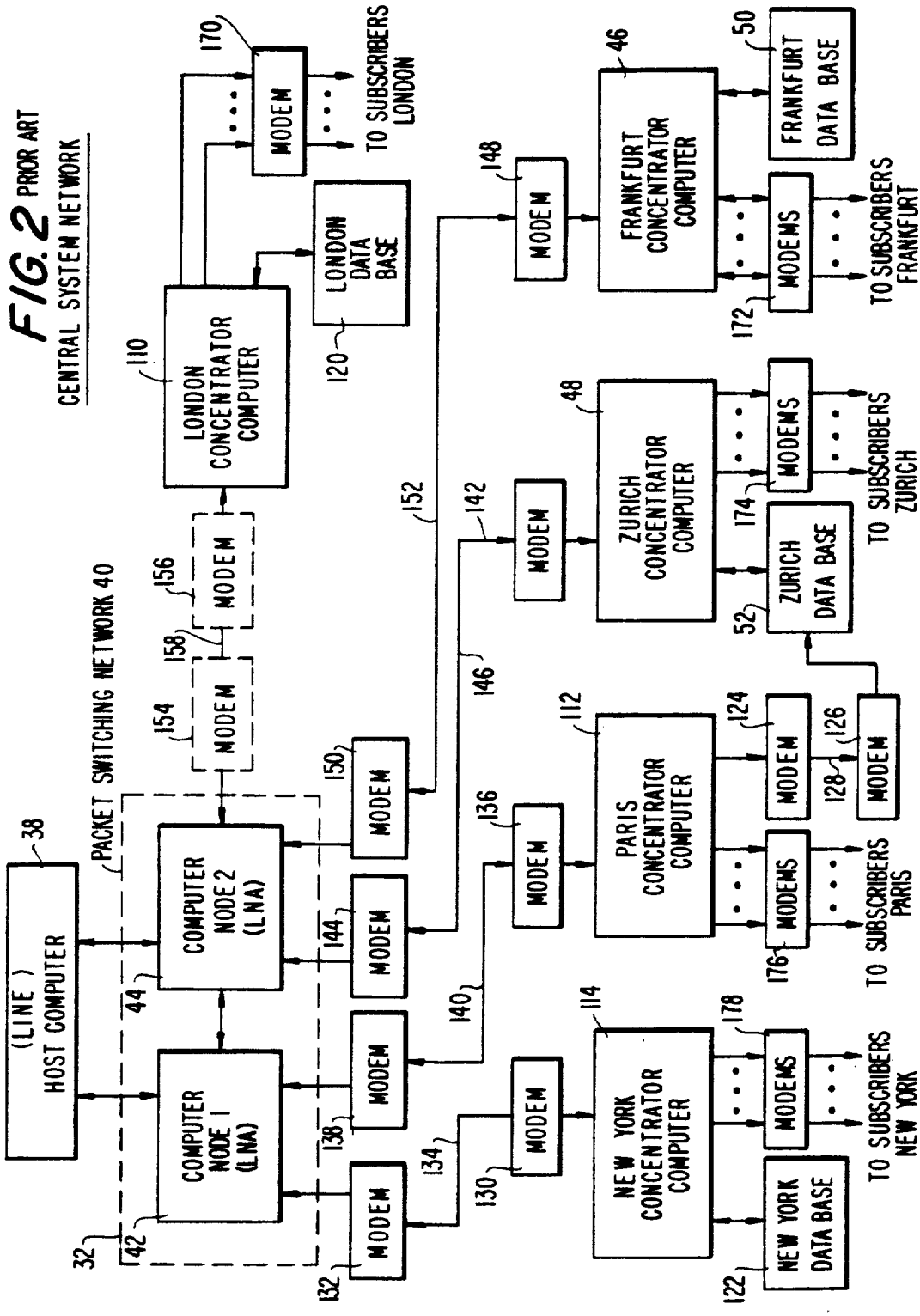
FIG. 2 is a functional block diagram of a typical central system network portion of the conversational video system of FIG. 1.

Referring now to the drawings in detail, and initially to FIGS. 1-3, 13A, 13B, 14A-14C, 15A, 15B, 16 and 17, the overall operation of the system of the present invention in establishing conversational contact in the manner set out in the commonly owned aforementioned U.S. Pat. No. 4,531,184, specifically incorporated by reference herein in its entirety, shall now be described for clarity so that the improved fast contact modification of the present invention can be more readily understood. In this regard, the same reference numerals utilized in U.S. Pat. No. 4,531,184 for like functioning portions are utilized herein. Suffice it to say, before commencing this description, the only visible addition to the overall functional block diagram of FIG. 1 over a similar diagram in U.S. Pat. No. 4,531,184 is the addition of a conventional screen pointer device, such as a conventional mouse 200 and associated interface hardware and software at the typical subscriber keystation, to enable the improvements of the present invention which shall be described in greater detail hereinafter with reference to FIGS. 4, 5, 6A, 6B, 6C, 7, 8, 9A, 9B, 9C, 10, 11 and 12. With the improvements of the present invention, the system of FIG. 1 can preferably provide both automatic conversational contact using the screen Pointer 200 in accordance with the present invention as well as conversational contact in the manner described in U.S. Pat. No. 4,531,184.

Figure 13A:
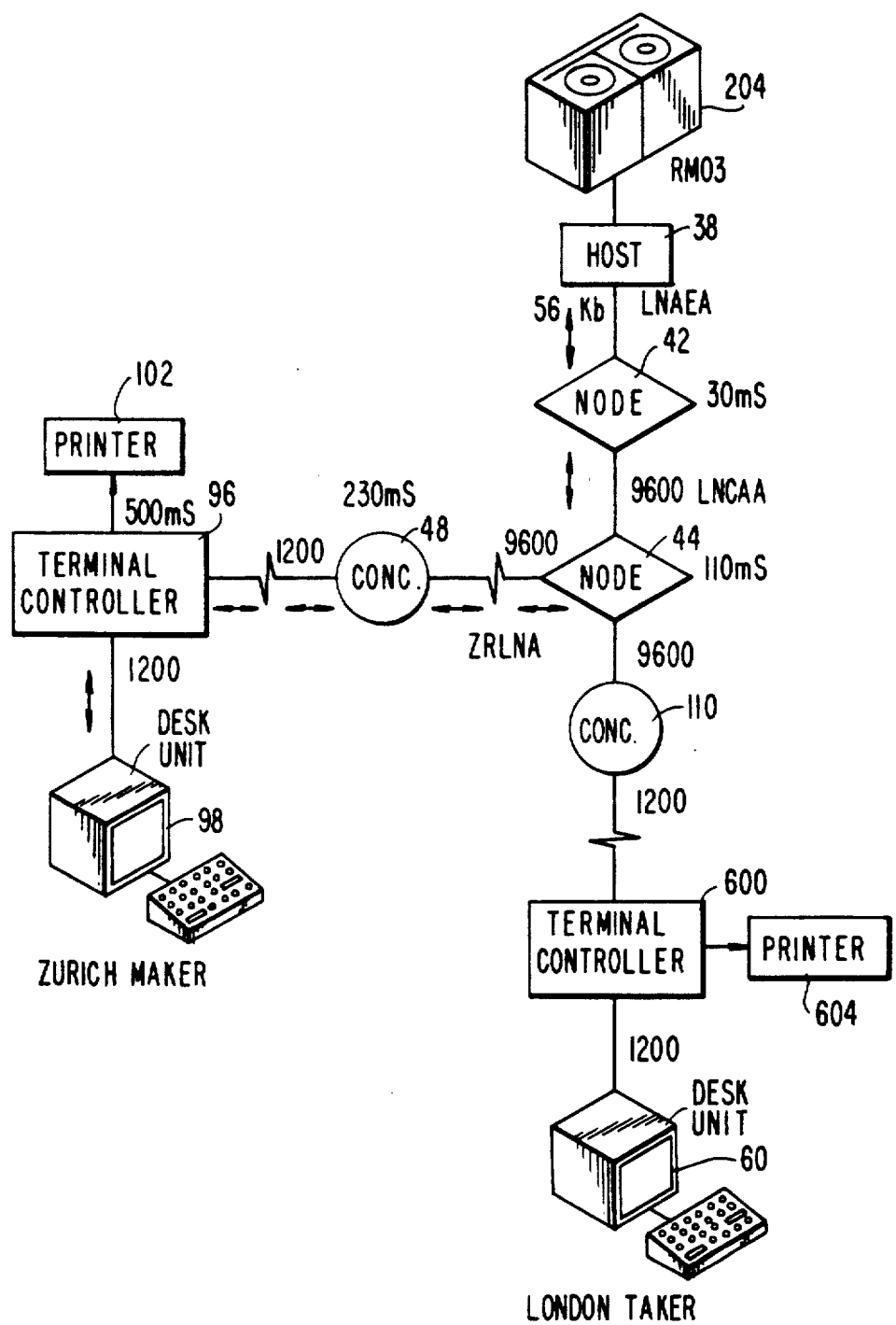
FIGS. 13A and 13B are diagrammatic illustrations of a typical conversational signal path in the system of FIG. 1 relating to setting up of a call.
Figure 13B:
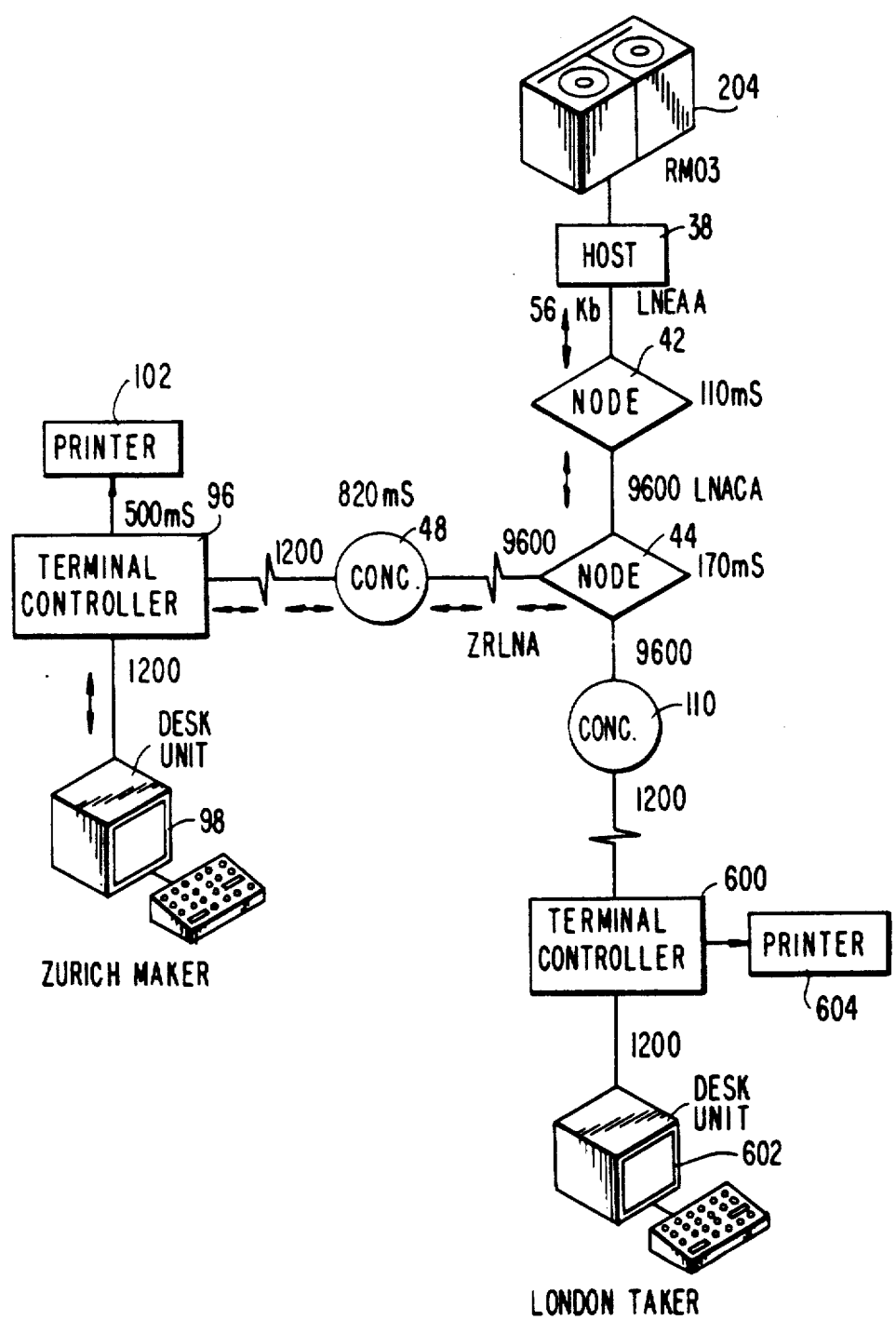

With respect to the provision of conversational contact in the manner described in U.S. Pat. No. 4,531,184, such as through the CALL or CONTACT LIST function of the system of FIG. 1, FIGS. 13A and 13B relate to the setting up of a call, by way of example, between a Zurich maker 98 and a London taker 602. In this regard, FIG. 13A illustrates the initiation of a CONTACT REQUEST or call, where, if the ADDRESS is a single character, it is expanded by accessing the ADDRESS abbreviations from disk, while if the ADDRESS constitutes a list of subscribers, in accordance with the CALL LIST or CONTACT LIST function of the system of FIG. 1, it causes the list to be held while the subscribers ar contacted in turn so e as to establish conversational contact with the first one or more free subscribers in the CALL LIST. For purposes of explaining the CONTACT LIST function, it is assumed that the London taker 602 has its corresponding keystation identification code contained in a CONTACT LIST which has been created by the Zurich maker 98 and that the London taker 602 is the first free subscriber in that CONTACT LIST. As will also be explained hereinafter, the Zurich maker 98, could have created a CONTACT LIST from his keyboard at any time prior to the initiation of the call to the London taker 602. In the following example, it is also assumed that the London taker 602 has not created an INHIBIT LIST containing the keystation identification code of the Zurich maker 98 which, as explained in U.S. Pat. No. 4,531,184, would cause caller 98 to be inhibited and would prevent or inhibit the completion of the call to the London taker 602 by the Zurich maker 98. FIG. 13B illustrates the checking by the host computer 38 to see if calls from the Zurich maker 98 have been inhibited by the London taker 602 as well as the checking to see if there is room in the subscriber's queue of the London taker 602, with the result of this investigation being sent back to the terminal controller 96 associated with the Zurich maker 98. Thus, if the call can be queued, the terminal controller 96 will be given an audit number of the call and any interest message, which, when the controller 96 receives this message, will cause the area for the display of the call to be cleared and will place the heading on the first line.

Figure 14A:
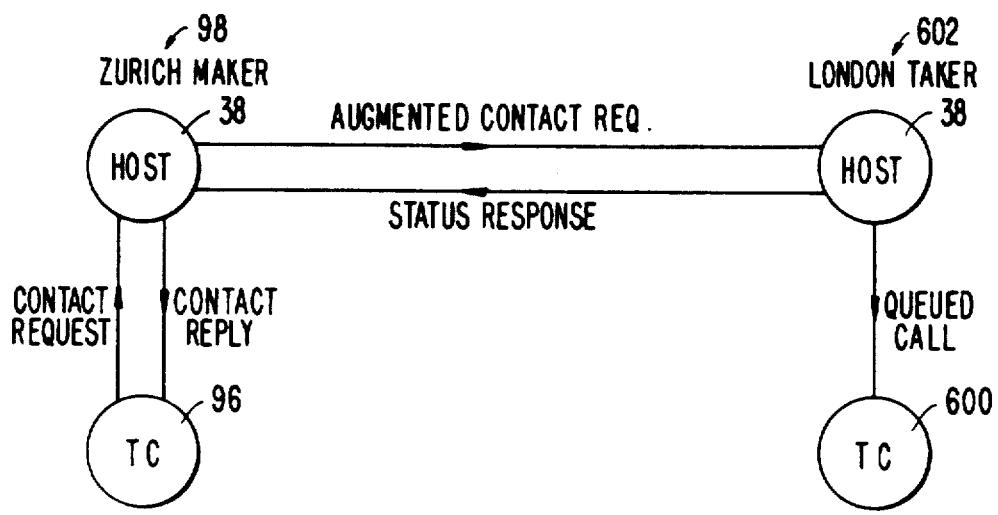
FIGS. 14A-14C are diagrammatic illustrations of the exchange of data records in the system of FIG. 1 during a tYPical conversation.
Figure 14B:
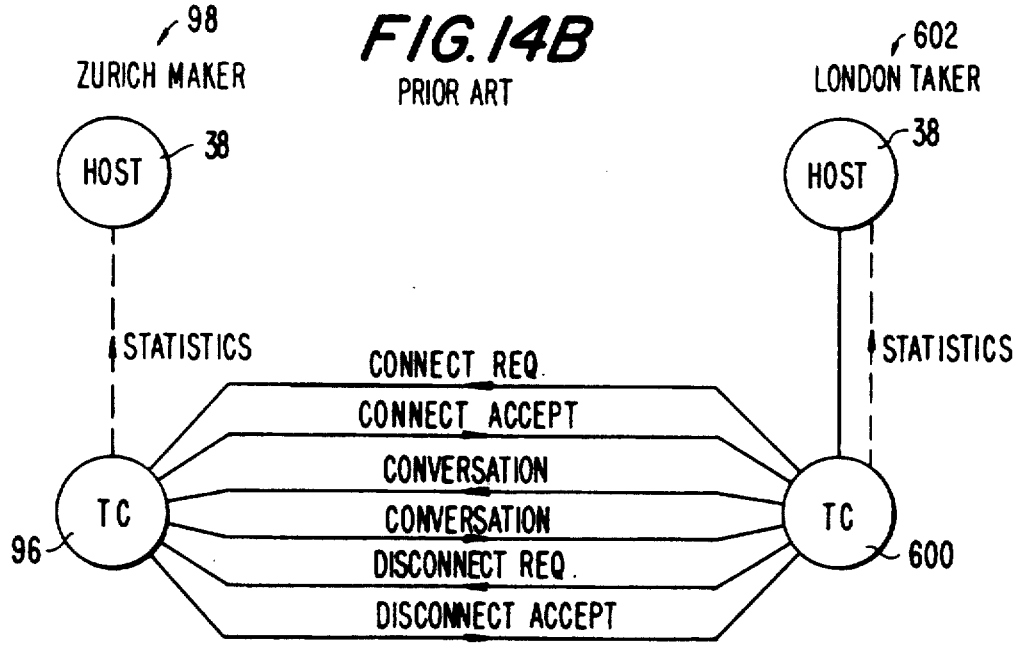
Figure 14C:
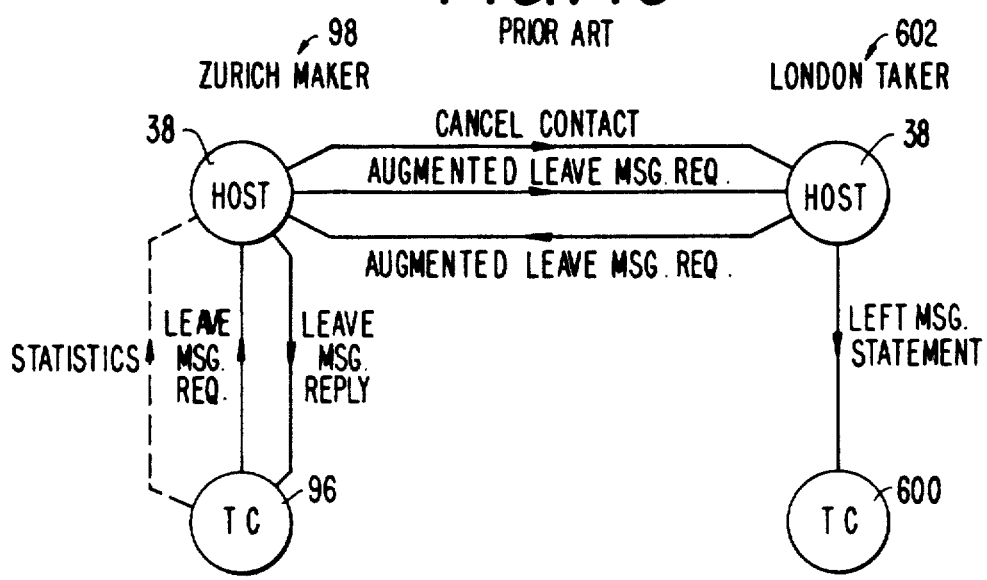

With respect to the setting up of a conversation, a conversation starts when one subscriber, the Zurich maker 98 in the above example, requests a contact with another subscriber, the London taker 602 by way of example, by an entry at his desk unit via his keyboard, or as will be described in greater detail hereafter with reference to FIGS. 4-12, by the use of the screen pointer 200, such as a double click mouse, locating the called party subscriber identification code in the video display, e.g., of a financial data page, such as REUTER MONITOR page FXFX in the example herein. The requesting of a contact causes the maker's terminal controller 96 to send a CONTACT REQUEST to the host computer 38 supporting the maker 98 in the above example. The CONTACT REQUEST, may contain either the mnemonic of the taker 602, a one character abbreviation of the mnemonic or a CONTACT LIST identifier such as L12 indicating CONTACT LIST 12. If the request contains a CONTACT LIST identifier, then the CONTACT LIST of the maker 98 is located on the SUBSCRIBER FILE 1000 and processing continues with the first subscriber on the CONTACT LIST. In this regard, the host computer 38 examines its table of conversations subscribers, known as the SUBSCRIBER TABLE 1002, and obtains the ADDRESS on the network 30 of the host computer 38 which is currently supporting the taker 602. In the example of FIGS. 13A and 13B, it is assumed that the same host computer 38 supports the maker 98 and the taker 602. The host computer 38 then passes what is termed an AUGMENTED CONTACT REQUEST to the host computer 38 associated with the taker 602, which in this instance is the same host computer and, therefore, merely involves a signal transfer with the host computer 38, which examines the status of the taker 602 and, if the taker 602 is not busy, that is if the queue of taker 602 is not full, sends a QUEUED CALL RECORD to the terminal controller 600 associated with the taker 602. If, however, the taker 602 is busy, that is not free, or if the maker 98 is o the inhibited subscriber list or INHIBIT LIST of the taker 602 which is stored in the SUBSCRIBER FILE 1000, then the contact is rejected, that is the call is inhibited. In this regard, if the CONTACT REQUESTS originated from a CONTACT LIST of the maker 98, then the taker 602 must be free. As will be explained hereinafter, if the taker 602 is not free, then the host computer 38 will continue to sequentially proceed through the CONTACT LIST in the same manner until a free taker is located, in which instance contact will be completed with the first free taker. Preferably, a STATUS RESPONSE RECORD is sent back to the maker's 98 host computer 38 indicating the success or otherwise of the initiated CONTACT REQUEST. If the original request is not from a CONTACT LIST, the host computer 38 of the maker 98 informs the maker's terminal controller 96 of the result of the CONTACT REQUEST by passing a CONTACT REPLY to the controller 96. The exchange of records in the system 30, assuring the taker 602 was not busy, up to this point, is illustrated by way of example in FIG. 14A. If, however, the original request by the maker 98 was from a CONTACT LIST Previously created by the maker 98, then if the STATUS RESPONSE received by the host computer 38 associated with the maker 98 indicates an unsuccessful request, then the next subscriber on the CONTACT LIST will be selected until the CONTACT LIST is exhausted and a CONTACT REPLY is sent to the originating terminal controller 96. When the taker 602 accepts the contact, his controller 600 sends a CALL ACCEPTED RECORD to the host computer 38 associated with his controller 600. The taker's controller 600 then connects to the maker's controller 96 and the textual data video conversation takes place. When the conversation ends, the controller owned by the subscriber who ends the conversation, either controller 96 or 600 in the above example, requests a disconnection from the other controller. If STATISTICS RECORDs are being kept, then, after the disconnection has been accepted each controller would send a STATISTICS RECORD to its associated host computer 38, such as shown in dotted lines in FIG. 14B. By way of example, the above exchange of records in the system 30 from acceptance of the contact to the point of disconnection is illustrated in FIG. 14B. Of course, prior to the call being accepted, the maker 98 may decide to cancel the CONTACT REQUEST and optionally leave a message with the taker 602. If the maker 98 decides to do this, his controller 96 would send a LEAVE MESSAGE RECORD to the supporting host computer 38 associated with the taker 602 and, if desired, a STATISTICS RECORD. The host computer 38 associated with the maker 98 will then preferably send a CANCEL CONTACT RECORD and an AUGMENTED LEAVE MESSAGE REQUEST to the taker's host computer 38. It will also preferably write the message to the taker's LEFT MESSAGE PAGE in the SUBSCRIBER FILE 1000, send a left message statement to the taker's controller 600 and an AUGMENTED LEAVE MESSAGE REPLY to the maker's associated host computer 38 which will then send a LEAVE MESSAGE REPLY to the maker's originating controller 96. This exchange of records is illustrated in FIG. 14C.

Subscribers in the system 30 ar preferably allocated an area of the SUBSCRIBER FILE 1000 in each of the host computers 38 where they ma be supported. In this area they may set up pages of information which they can have displayed on their desk unit and which they may amend from their keyboard. The pages stored may contain, by way of example, up to 100 subscribers from whom the page owner wishes to inhibit contact requests in what is termed an INHIBIT LIST, up to 26 abbreviations each related to a SUBSCRIBER MNEMONIC or ADDRESS, up to 1000 characters of text abbreviations which are used during a conversation and are, therefore, expanded into text by the associated terminal controller, up to 15 message pages which a subscriber may make available for viewing to other subscribers on an associated CONTACT LIST in what may be referred to as a CONTACT LIST PAGE, 15 CONTACT LISTS, each CONTACT LIST containing up to 20 SUBSCRIBER MNEMONICS, with these CONTACT LISTS being associated with a contact list message page as well as being usable to request contacts to the first one or more free subscribers on the CONTACT LIST as mentioned above, and up to 20 Left Messages. It should be noted that the above parameters are merely given by way of example.

Figure 15A:
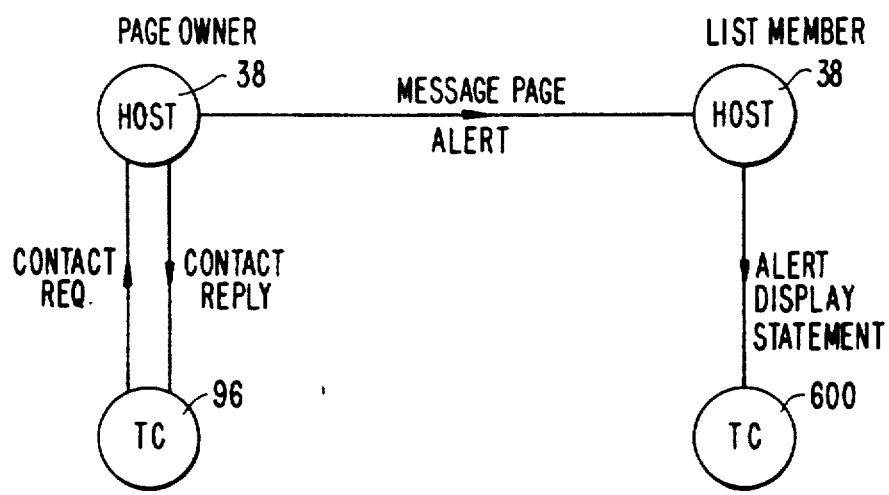
FIGS. 15A and 15B are diagrammatic illustrations of the exchange of data records in the system of FIG. 1 during the provision of a subscriber page to subscribers on the CALL LIST.
Figure 15B:
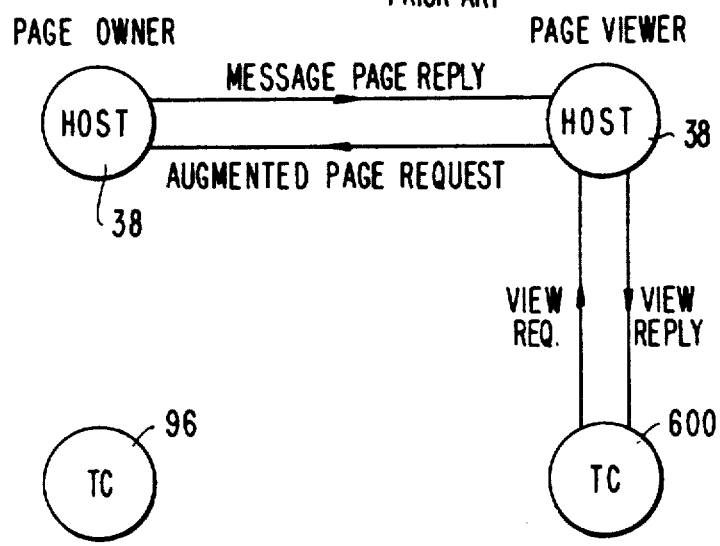

The owning subscriber keystation, that is the one which created the aforementioned lists, messages or pages, can view any of these pages and can preferably insert entries to these pages and cancel entries in all pages as well as, of course, being able to cancel entire pages. In this regard, when an amendment to the TEXT ABBREVIATIONS PAGE has been completed, this amended page would be sent to the page owner's terminal controller, 96 for example, since expansion of the abbreviation during a conversation takes place in the terminal controller. An originating subscriber can send a CONTACT LIST PAGE or SUBSCRIBER PAGE simultaneously to all subscribers on a given CONTACT LIST. This may be accomplished by sending a CONTACT LIST PAGE calling signal or CONTACT REQUEST from the terminal controller 96 to the host computer 38 which contains the page identifier. The host computer 38 will then send a CONTACT REPLY to the originating controller 96 and will then send to the host computer, 38 in the above example, of each member of the CONTACT LIST an ALERT RECORD which will then be passed on to each associated terminal controller 600 owned by each CONTACT LIST member. The alert will then appear on the display screen of each desk unit associated with the terminal controller 600. The above exchange of records is illustrated in FIG. 15A. A member on the CONTACT LIST wishing to view this ALERTED PAGE which has been transmitted by the page owner indicates this on his keyboard at the keystation associated with terminal controller 600 which causes a VIEW REQUEST RECORD to be sent from controller 600 to the associated host computer 38 which, in turn, sends an AUGMENTED PAGE REQUEST to the page owner's host computer 38. The host computer 38 then passes on the page contents in a VIEW REPLY. The above exchange of records is illustrated in FIG. 15B.

Figure 16:
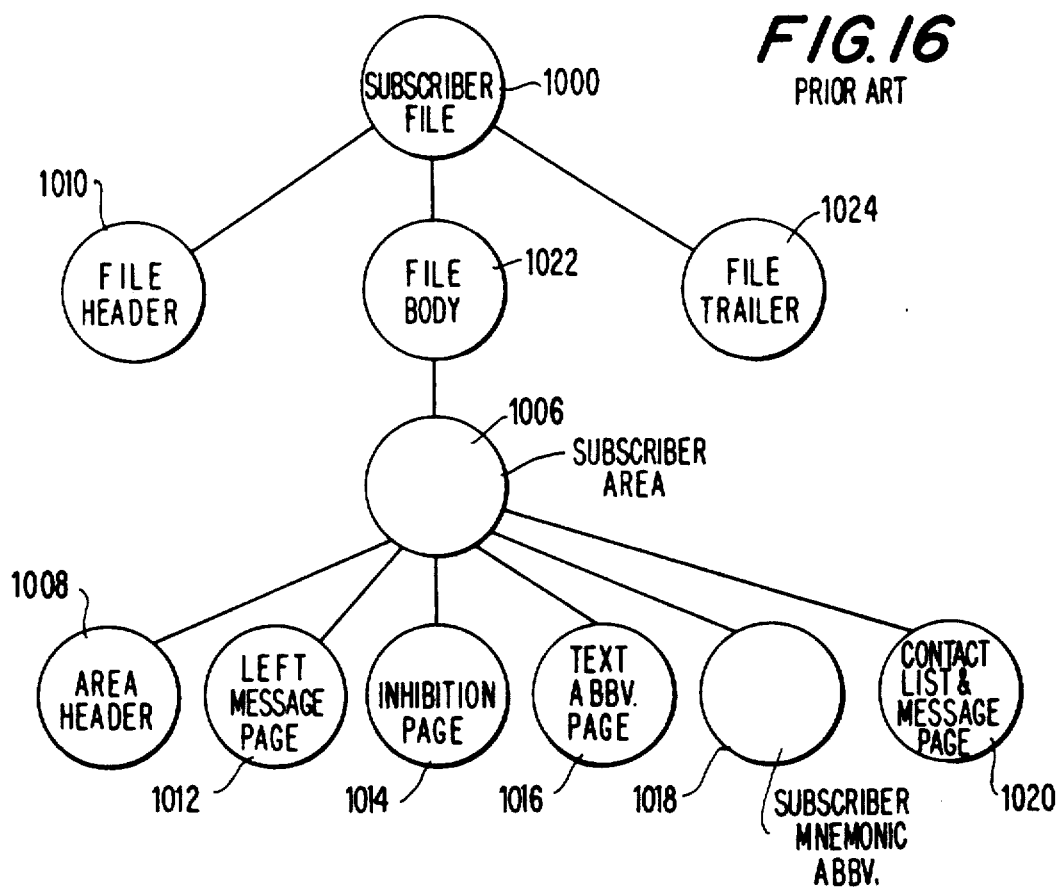
FIG. 16 is a diagrammatic illustration of the structure of the Subscriber File in the system of FIG. 1.
Figure 17:
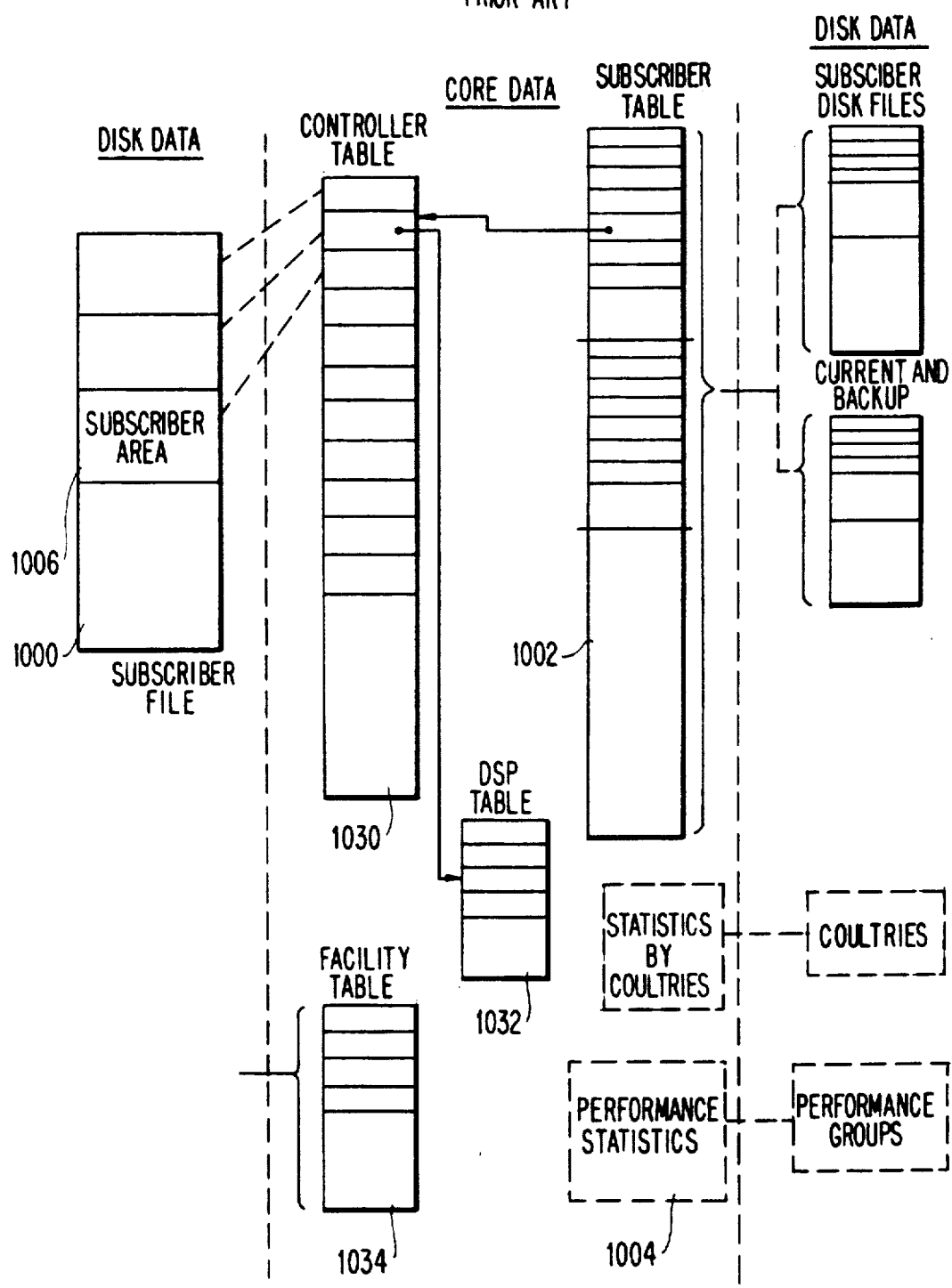
FIG. 17 is a diagrammatic illustration of the main data structure in the host computer portion of the system of FIG. 1.

In order to facilitate the understanding of the present invention, a brief word about file organization of the SUBSCRIBER FILE 1000 previously referred to above, will be provided below with references to FIGS. 16 and 17. Thus, the static information retained by the system 30 may preferably be stored in two files, the SUBSCRIBER FILE 1000 and the SUBSCRIBER TABLE FILE 1002 with, if desired, an additional PERFORMANCE STATISTICS FILE 1004 also being provided for retaining performance statistics. These files 1000, 1002 and 1004 are illustratively represented in FIG. 17 with as previously mentioned, the SUBSCRIBER FILE being given reference numeral 1000 the SUBSCRIBER TABLE being given reference numeral 1002 and the optional PERFORMANCE STATISTIC FILE being given reference numeral 1004. Each file 1000, 1002, 1004 preferably contains in its header an indicator which is used during initialization to discover whether the file 1000, 1002, 1004 has been previously used by the system 30 or has been created by the file generator and is, therefore, what would be termed empty. Preferably a check that the same versions of the file 1000, 1002, 1004 are being used is also performed during initialization by comparing the dates and times from the file headers. For purposes of the explanation herein, the most Pertinent file is the SUBSCRIBER FILE 1000 which is also shown in greater detail in FIG. 16. All static data related to the subscribers supported by the host computer 38 are preferably stored in the SUBSCRIBER FILE 1000 with each subscriber being allocated a SUBSCRIBER AREA 1006 in which the tables or pages of information which a particular subscriber owns are stored. The first block of the SUBSCRIBER FILE 1000, as will be described hereinafter, preferably contains a header record with each SUBSCRIBER AREA 1006 preferably containing a AREA HEADER RECORD 1008 followed by the subscriber owned pages. With respect to the FILE HEADER RECORD 1010, this record 1010 preferably contains the dates and times when the subscriber pages stored in the SUBSCRIBER FILE 1000 were last updated and a bit map showing which SUBSCRIBER AREAS 1006 in the SUBSCRIBER FILE 1000 are unused. By way of example, the bit map may allow for 504 SUBSCRIBER AREAS 1006. Each AREA HEADER RECORD 1008 preferably contains the dates and times when the subscriber pages associated with that SUBSCRIBER AREA 1006 were last amended. A particular SUBSCRIBER AREA 1006 preferably contains the subscriber owned pages associated with the subscriber associated with a given SUBSCRIBER AREA 1006, such as the LEFT MESSAGE PAGE 1012, INHIBIT PAGE 1013, TEXT ABBREVIATION PAGE 1016, SUBSCRIBER MNEMONIC ABBREVIATION PAGE 1018, and the subscriber CONTACT LIST and MESSAGE PAGES 1020. The LEFT MESSAGE PAGE 1012 contains messages left for the owning subscriber by other subscribers who have attempted to contact him with the oldest message being removed from the LEFT MESSAGE PAGE 1012 when the new message is received. The page owner may view the LEFT MESSAGE PAGE 1012 and cancel individual or all messages o the LEFT MESSAGE PAGE 1012, with each message added to this page 1012 preferably being assigned a number. The INHIBIT PAGE 1014 is the subscriber created page in which the page owner may set up a list consisting of the mnemonics of, by way of example, up to 100 subscribers from which he does not wish to receive any CONTACT REQUESTS, as previously mentioned. The mnemonics are preferably stored in sequence and the page owner can view the page, insert mnemonics and cancel individual or all mnemonics on this page 1014. The TEXT ABBREVIATIONS PAGE 1016 contains text abbreviations which are used by the desk units during conversations and is, therefore, preferably stored in both the host computer 38 and the owning subscriber's terminal controller 96 or 600. This TEXT ABBREVIATIONS PAGE 1016 is preferably down-line loaded to the associated terminal controller 96 or 600 after each set of amendments to the page as well as when the terminal controller 96 or 600 signs on to the system 30. Each record in the TEXT ABBREVIATIONS PAGE 1016 would preferably consists of an abbreviation of, by way of example, up to 6 characters and text of up to 60 characters with a storage capacity, by way of example, of up to 1000 characters of abbreviation and text. Again, the page owner may view the TEXT ABBREVIATION PAGE 1016, insert new abbreviations and cancel individual or all abbreviations. With respect to the SUBSCRIBER MNEMONIC ABBREVIATIONS PAGE 1018, when requesting a contact, a subscriber may use an abbreviation rather than the other subscriber's mnemonic. As such, subscribers may set up their own tables of abbreviations which are contained in the SUBSCRIBER MNEMONIC ABBREVIATIONS PAGE 1018 and the page owner may view this page 1018, insert new abbreviations and cancel individual or all abbreviations on this page 1018. By way of example, each abbreviation is of one character and the mnemonic associated with the abbreviation may include two characters indicating a particular desk unit or dealer. Lastly, with respect to the CONTACT LISTS and MESSAGE PAGES 1020, as was previously mentioned, each subscriber may set up MESSAGE PAGES and associated CONTACT LISTS with the owning subscriber being able to make a MESSAGE PAGE available to all subscribers on a particular CONTACT LIST or to request a contact with the first free subscriber on the CONTACT LIST. Preferably, each MESSAGE PAGE and CONTACT LIST is contained within a disk block and a subscriber may, by way of example, set up up to 15 pages and CONTACT LISTS. These CONTACT LISTS and MESSAGE PAGES may be viewed by the owning subscriber and amended independently. Preferably the MESSAGE PAGE consists of texts which will fit into the display area of a desk unit with the CONTACT LIST preferably, by way of example, consisting of up to 20 SUBSCRIBER MNEMONICS. It should be further noted with reference to FIG. 16, that the SUBSCRIBER FILE 1000 also preferably conventionally contains a FILE BODY 1022 which incorporates a number of the aforementioned SUBSCRIBER AREAS 1006 and a FILE TRAILER 1024 to complete the SUBSCRIBER FILE 1000. Similarly, with reference to FIG. 17, assuming that more than one terminal controller is supported by the host computer 38, the host computer 38 also preferably contains a CONTROLLER TABLE 1030 as well as other appropriate tables and files. FIG. 17, as was previously mentioned illustrates the main data structures in the host computer 38. With respect to FIG. 17, the information held on file for each subscriber supported by the host computer 38 preferably includes the subscriber's short name, the subscriber's 20 character answerback code, the subscriber's queue limit, the subscriber's ADDRESS abbreviation table, the subscriber's inhibit table which states from whom he will not acoept calls, the subscriber's user abbreviation table for loading into the associated terminal controller 96 or 600, up to 20 messages left for the subscriber and 15 blocks each containing a CONTACT LIST and a MESSAGE PAGE. In addition, other core tables are also maintained in the host computer 38 such as the DSP TABLE 1032 which preferably contains information on the logical links to each concentrator 38, 110, by way of example, used to link a supported terminal controller 96, 600, the FACILITY TABLE 1034 which contains information on each conversational facility, the aforementioned SUBSCRIBER TABLE 1002 which contains an ordered list of all subscribers in the system 30 and contains their state and the ADDRESS of the host computer currently supporting them, and the CONTROLLER TABLE 1030 which contains dynamic information on each terminal controller which may be supported. The information contained in the CONTROLLER TABLE 1030 may preferably include the route to the concentrator and the terminal controller, the status of the terminal controller, the queue limit for the subscriber, the current number of free desk units for a particular terminal controller and the length of the calls queue, the current conversation audit number for the particular terminal controller and a link to other terminal controllers for the same subscriber. As was also previously mentioned, if desired, other tables may be employed to collect statistics 1004 for accounting. In addition, as was previously mentioned with respect to the description in detail of the terminal controller 96 or 600, the controller holds the text of any current conversation and is responsible for printing this text as well as also containing information on the route set up to the other terminal controller in each call. In addition, the terminal controller preferably holds the user abbreviation table for the subscriber and the 20 character answerback code used by the subscriber.

Figure 3:
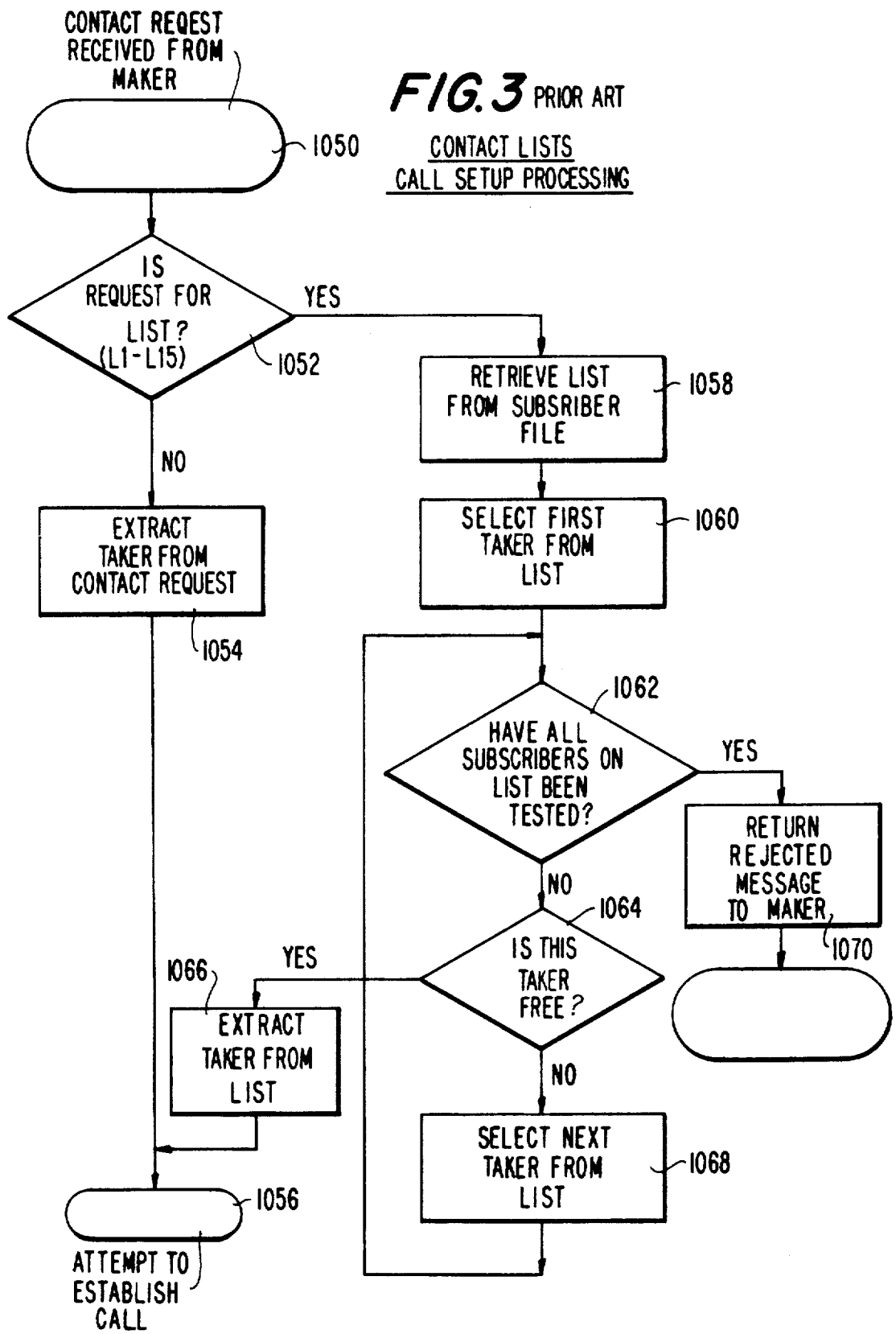
FIG. 3 is a logic flow diagram of the condition responsive message routing logic portion of the system of FIG. 1 in connection with the establishment of a conversation in response to a contact request from a maker utilizing the CALL LIST facility, of the system in FIG. 1.

Referring now to FIG. 3, a logic flow diagram of the condition responsive message routing logic portion of the system 30 in connection with the establishment of a conversation in response to a CONTACT REQUEST from a maker utilizing the aforementioned CALL LIST facility o feature is shown. Thus, when a user enters a CONTACT REQUEST, the message with the current insert line is sent over the logical link to the host computer 38 supporting the subscriber which interprets this insert line. This is illustratively represented by reference numeral 1050 in FIG. 3. If the ADDRESS is a single character, it is expanded by accessing the address ABBREVIATIONS PAGE from the disk file. If the ADDRESS constitutes a CONTACT LIST of subscribers it causes the CONTACT LIST to be held in core while the subscribers are contacted in turn, whereas if the ADDRESS references a CONTACT LIST the CONTACT LIST is brought into core for action. This determination as to whether the request is for a CONTACT LIST is represented by reference number 1052 in FIG. 3. If the request is not for a CONTACT LIST, then the host computer 38 extracts the taker's ADDRESS from the CONTACT REQUEST, looks up the ADDRESS subscriber in the SUBSCRIBER TABLE and sends a message to the supporting host computer for this subscriber which message includes a location of the requesting terminal controller and may preferably include the time of contact. This process is unaffected even if the same host computer supports both subscribers, as in the above example. This procedure is represented by reference numerals 1054 and 1056 in FIG. 3. If however, the CONTACT REQUEST is for a CALL LIST, then the CALL LIST is retrieved from the SUBSCRIBER FILE and the host computer selects the first taker from the CALL LIST and attempts to establish a call. If this taker is not free, then the host computer 38 selects the next taker from the CALL LIST and continues this procedure sequentially going through the CALL LIST until all subscribers have been tested in an effort to establish a call with the first free subscriber on the CALL LIST. If there are no free subscribers on the CALL LIST, then a rejected message is returned to the maker. This procedure is represented by reference numerals 1058, 1060, 1062, 1064, 1066, 1056, 1068 and 1070 in FIG. 3. As was previously mentioned, the taker's host computer will check if call is not inhibited. The result of this investigation, as was previously mentioned, is sent back to the maker's host computer and therefrom to the associated terminal controller where, if the call can be queued, the terminal controller will be given an audit number for the call and the interest message. When the terminal controller receives this message, it will clear the area for the display of the call and place the heading on the first line and the interest message, if any, on the second line. By way of example, a typical CALL LIST or CONTACT LIST display which may appear at the owning subscriber's terminal is illustrated in FIG. 4. If, however, the caller is inhibited, whether the caller is contained on a CONTACT LIST request or on a direct request, then the call will not be completed as previously mentioned. By way of example, a typical CONTACT LIST and MESSAGE PAGE table is illustrated below in TABLE A.

TABLE A

CONTACT LIST and MESSAGE PAGE
(Computer PDP-11; Table Size: 512 bytes)

| Location | Type | Description of Cross X-Ref | Null Value |
|---|---|---|---|
| 1-4 | 4 BYTES | Owning SUBSCRIBER MNEMONIC | high value |
| 5 | BYTE | Current Amending DU | 0 |
| 6 | BYTE | Spare | — |
| 7-12 | 6 BYTES | Date/Time of last update to this page | bin 0 (6) |
| 13 | BYTE | Number of entries in | 0 |
| 14 | BYTE | Number of bytes used in CONTACT LIST | 0 |
| 15-16 | INT | Number of bytes used in Send Message | 0 |
| 17 | BYTE | Availability (of SM page) flag | 0 |
| 18-97 | 4 BYTES | CONTACT LIST (20 subscriber mnemonics) | Space (80) |
| 93-512 | 415 BYTES | Send Message | Space (415) |

It should be noted that a CONTACT LIST may be specified on user insert line, for example CNV CNTCT ABCD, BCDE, CDEF INTEREST MSG. In the above user insert line, the subscriber is dynamically creating a CONTACT LIST prior to set up of a call as opposed to referring to a CONTACT LIST previously stored in memory in the host computer 38. Alternatively, the subscriber can specify the use of one of his up to 15, by the way of example, prestored CONTACT LISTS in which instance, the CONTACT LIST would be specified by L, followed by the CONTACT LIST number, for example CNV CNTCT L12 INTEREST MSG. Thus, as previously mentioned, the subscriber can create a CALL or CONTACT LIST at any time up until the call is actually initiated and the CONTACT LIST may come from a prestored CONTACT LIST in memory or may be dynamically created at the time the call is to be initiated. In addition, as was also previously mentioned, the subscriber may send a page to the various subscribers on the CONTACT LIST, such as bY entering such a request, represented by P followed by the number of the CONTACT LIST to be used such as for example CNV CNTCT P12. Thus, the user insert line can be used to attempt to establish a call using the CONTACT LIST feature in the present invention. In addition, as w 11 be described in greater detail hereinafter a fast con act list can be established without using a prestored contact list through the use of a screen pointer 200 and the modifications of the present invention.

Referring now to FIGS. 4, 5, 6A, 6B, 6C, 7, 8, 9A, 9B, 9C, 10, 11 and 12, the fast contact feature of the present invention shall now be described. By way of example, FIG. 5 illustrates a typical financial data storage video display, such as a REUTER MONITOR PAGE FXFX or REUTER DEALING page in accordance with the present invention in which an interest message is to be provided with a contact to the called party, and FIG. 7 illustrates a similar situation in which no interest message is to be provided. As was previously explained, the conventional screen pointer 200, such as a conventional mouse or conventional touch screen, is preferably conventionally used to indicate a particular point or location on the financial data page video display, such as would be conventionally accomplished using a commercially available program from Microsoft entitled "Windows". As will be explained in greater detail hereinafter, assuming a conventional mouse 200 is employed in the system 30, if the mouse 200 is clicked while pointing at a designated sequence of characters, such as by way of example, a sequence of 5 or 6 characters in which the first 4 are letters, then it is taken by the system 30 and the host computer 38, by way of example, as a request for a fast contact in accordance with the present invention. The aforementioned conversational contact function CNV CNTCT is preferably selected and the first four letters are entered as an address. By way of example, the remaining characters are interpreted as follows by the system 30 of the present invention, referring to the window display examples of FIGS. 4 and 7. The asterisk (*) is merely used as a unique identifier for a fast contact and is otherwise ignored. If a letter follows the asterisk (*) such as in the example of FIGS. 4 and 7, the letter represents an interest message code which may be expanded to a predefined interest message in accordance with the present invention by way of example, as follows below in Table B.

TABLE B

| *A | SPOT ATS PSE |
| *B | SPOT BEC PSE |
| *C | SPOT CHF PSE |
| *D | SPOT DEM PSE |
| *E | SPOT ESP PSE |
| *F | SPOT FFR PSE |
| *G | SPOT GBP PSE |
| *H | SPOT DKK PSE |
| *I | SPOT ITL PSE |
| *J | SPOT JPY PSE |
| *K | SPOT FIM PSE |
| *L | SPOT NOK PSE |
| *M | SPOT KWD PSE |
| *N | SPOT NLR PSE |
| *O | SPOT BEF PSE |
| *P | SPOT POE PSE |
| *Q | SPOT IEP PSE |
| *R | SPOT CAD PSE |
| *S | SPOT SEK PSE |
| *T | SPOT AUD PSE |
| *U | SPOT SAR PSE |

TABLE B-continued

| | |
|---|---|
| *V | SPOT ZAR PSE |
| *W | (No expansion defined - acts like*) |
| *X | SPOT XEU PSE |
| *Y | SPOT SGD PSE |
| *Z | SPOT HKD PSE |

Figure 6B:
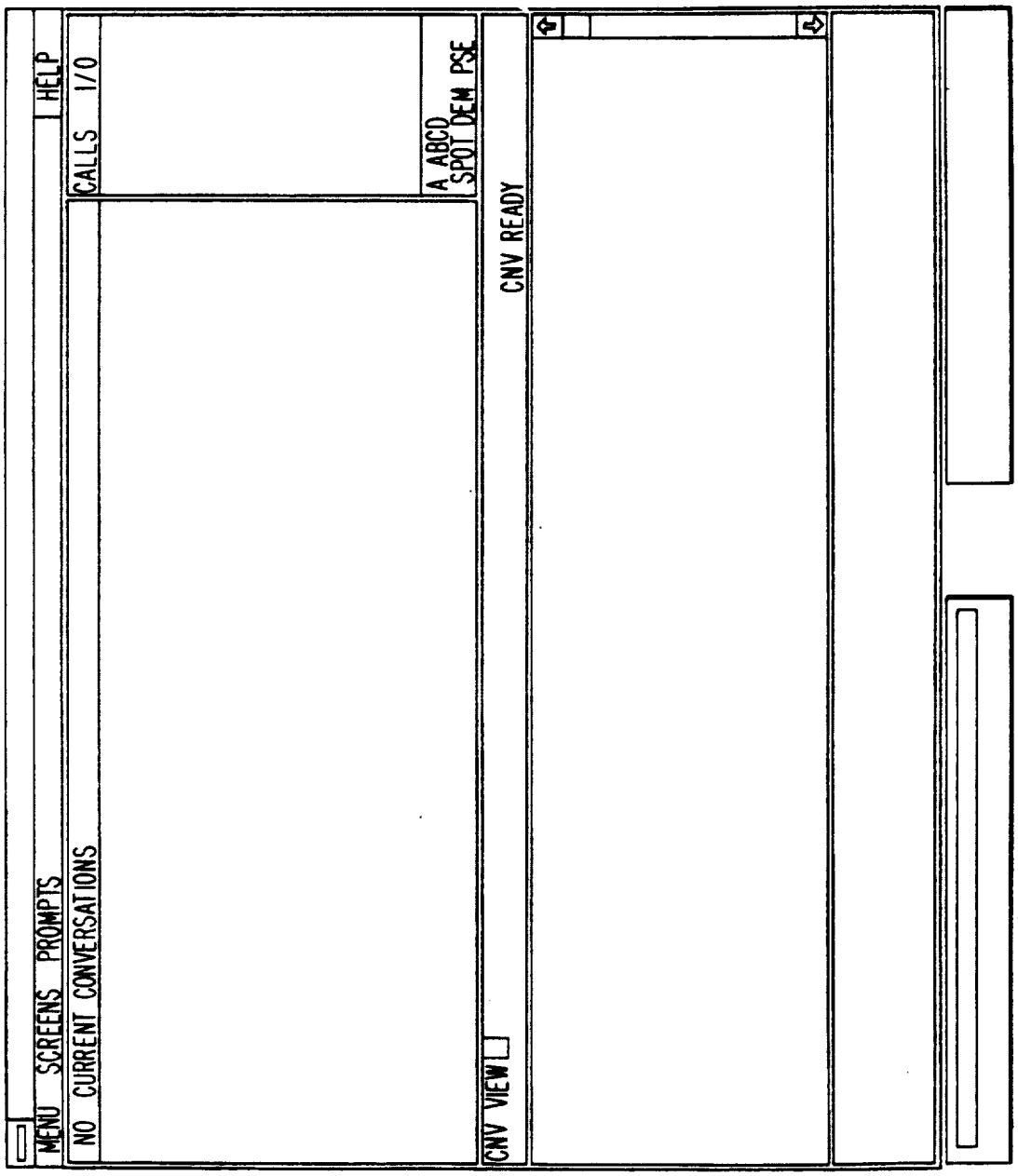
FIG. 6B is a diagrammatic illustration of the resultant incoming call message on the remote called terminal in accordance with the present invention.
Figure 6C:
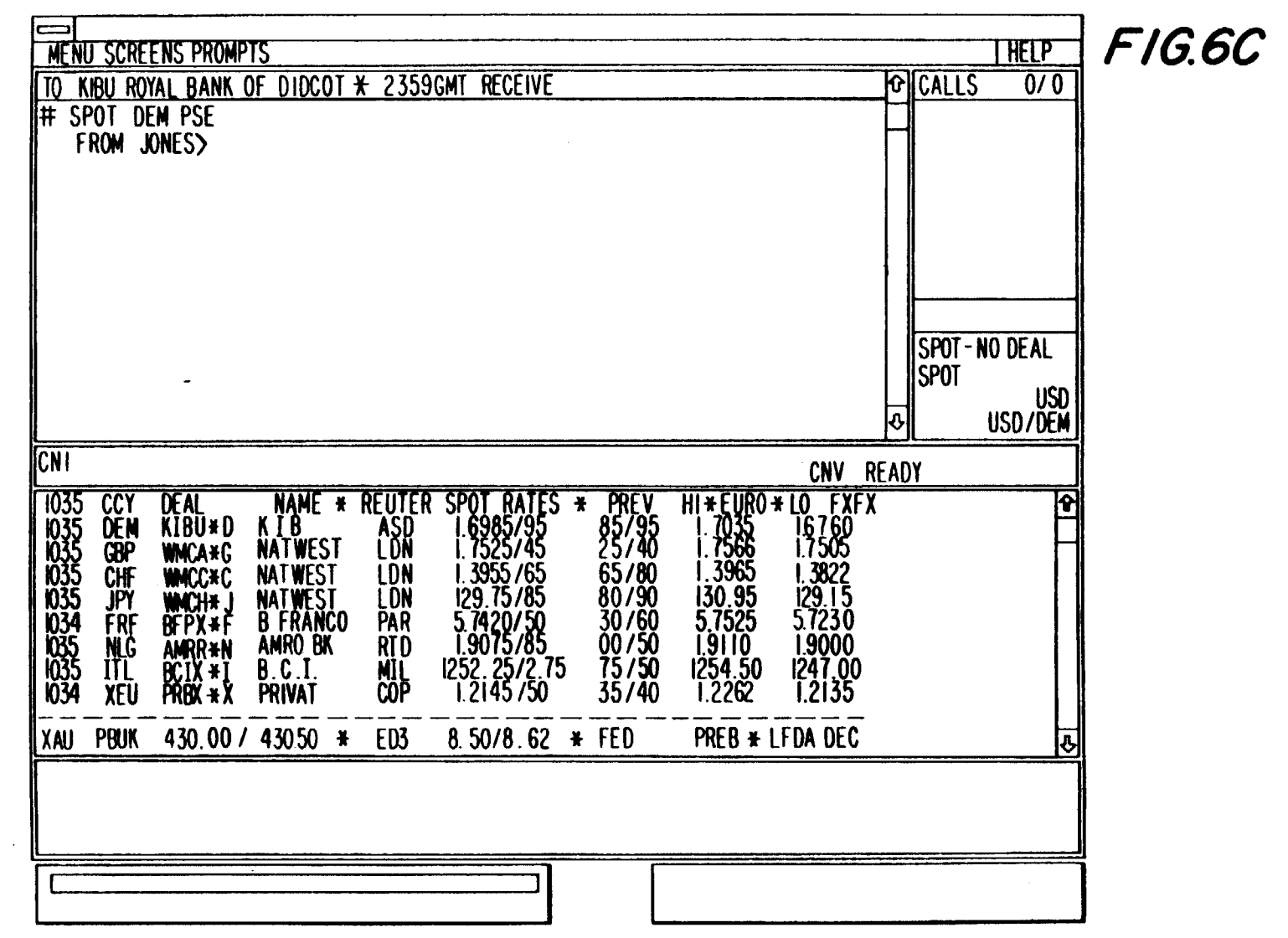
Figure 9B:
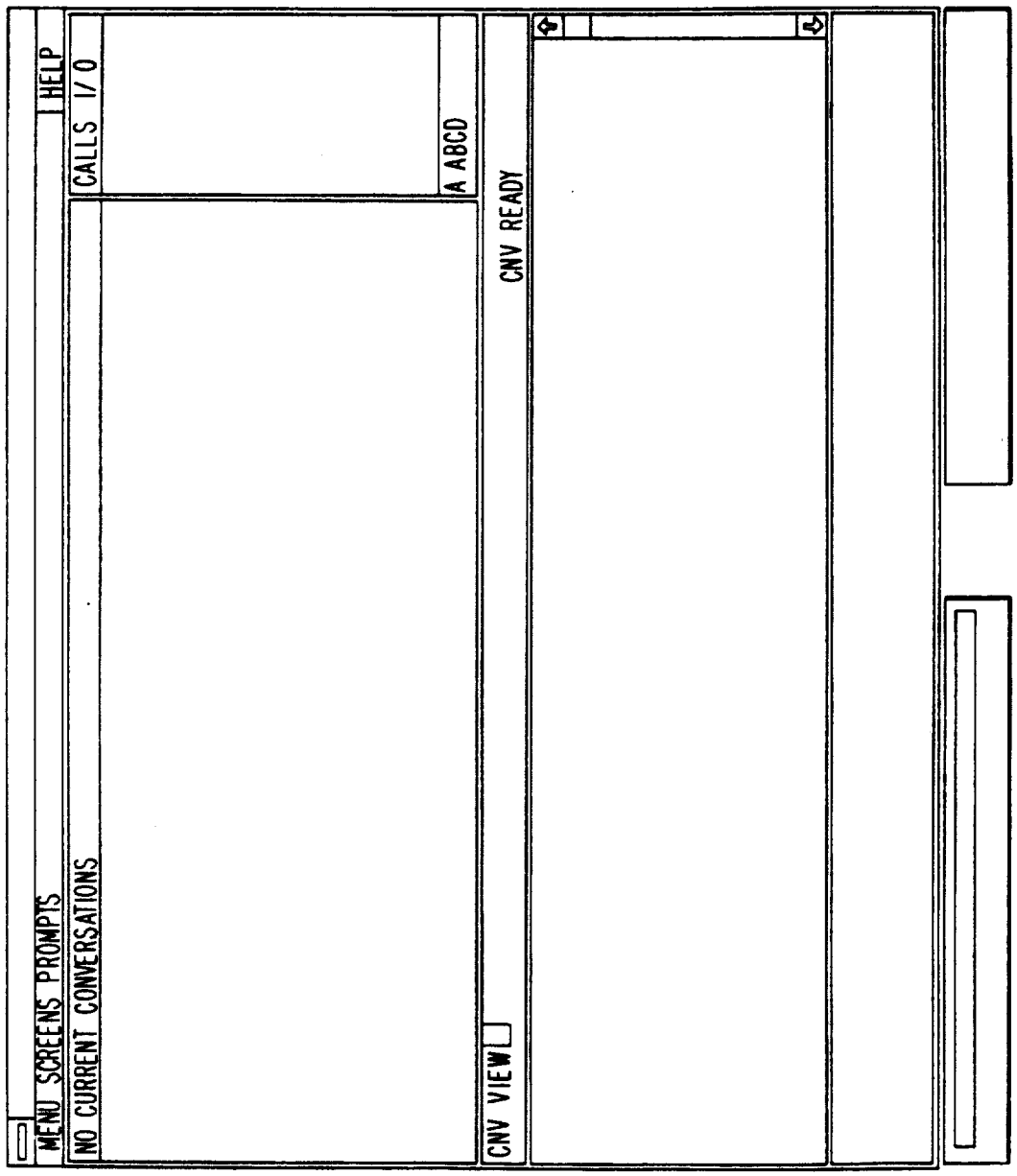
FIG. 9B is a diagrammatic illustration, similar to FIG. 6B, of the resultant incoming call message on the remote called terminal in accordance with the present invention.
Figure 9C:
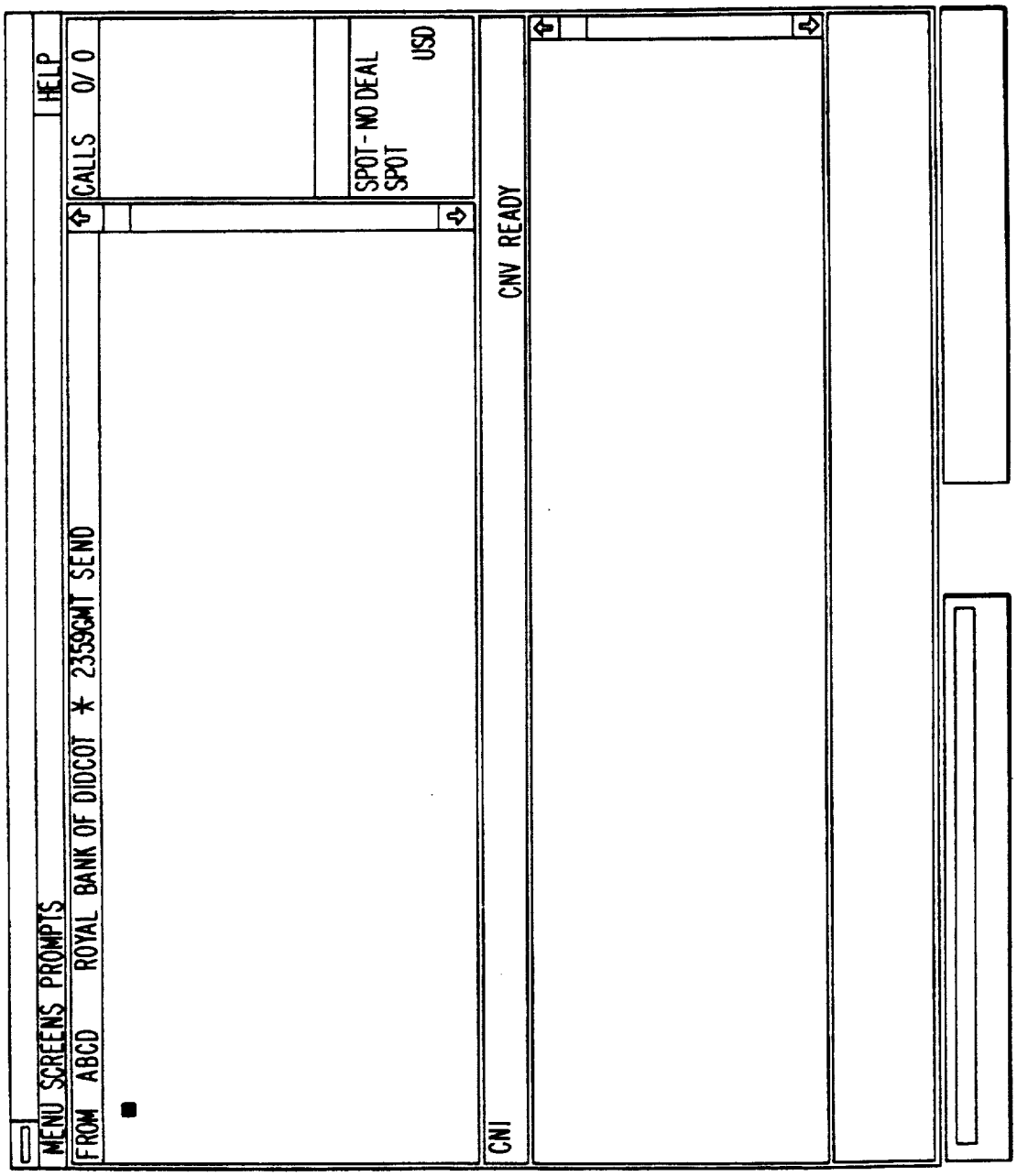
FIG. 9C is a diagrammatic illustration, similar to FIG. 6C, of the video display after the call has been accepted by the called party.

In the above example, if the mouse 200 is double clicked, then the second click has the effect of pressing the TRANSMIT key on the contact line which has been constructed; in other words, it performs the contact. The conversational contact message and functions which occurs if the double click mouse 200 is employed where there is an interest message is illustrated in FIGS. 6A-6C, and this message and functions when there is no interest message is illustrated in FIGS. 9A-9C. In this regard, FIG. 5 illustrates the video display after a single click on the mouse 200 and the corresponding expanded interest message transmitted and inserted in the command line, and FIG. 8 illustrates this situation when no interest message has been employed.

Figure 10:
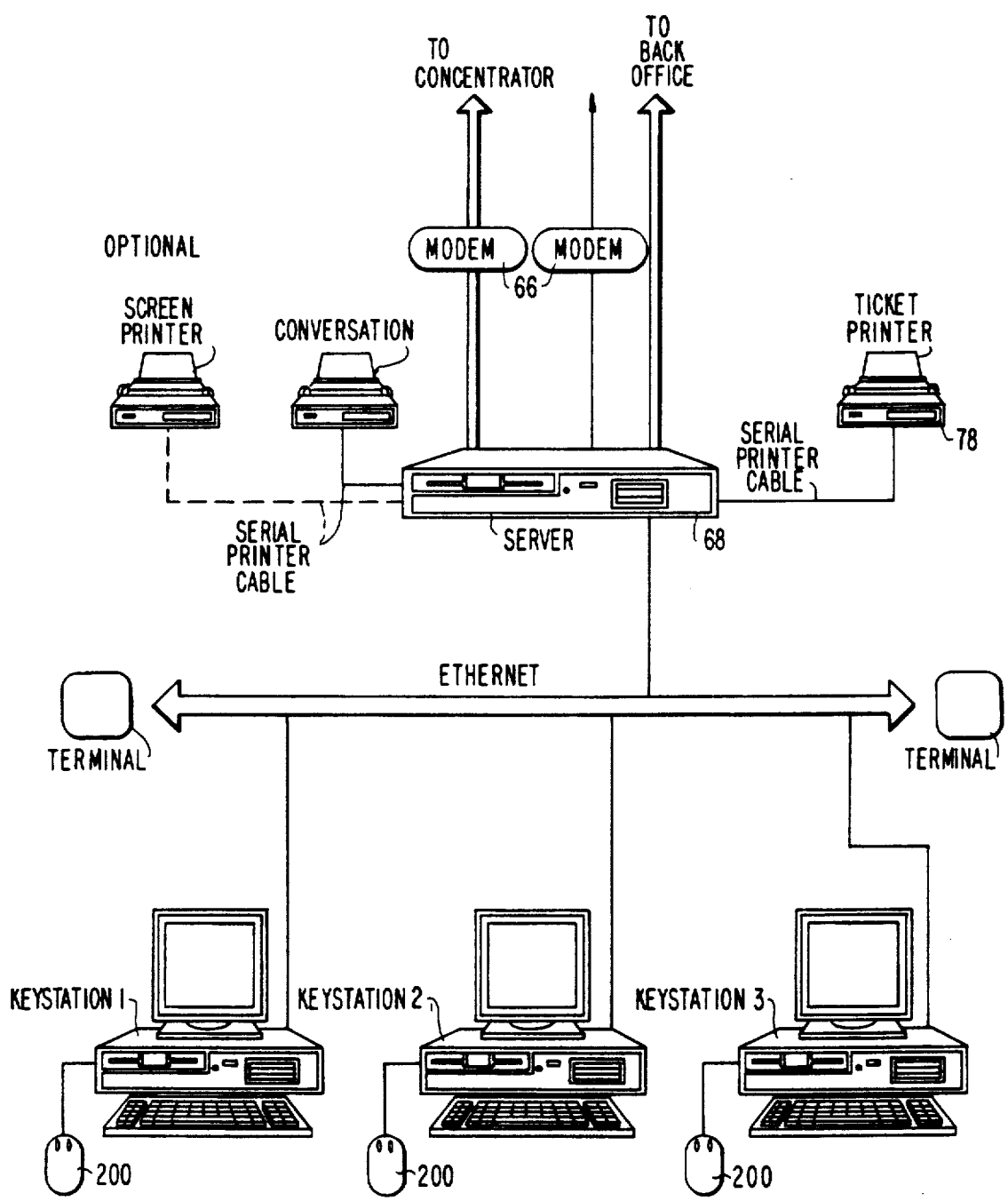
FIG. 10 is a diagrammatic illustration of a typical client site in accordance with the present invention.

An example of the presently preferred softward for enabling the system 30 to accomplish the fast contact function of the present invention is given below in TABLE C by way of example, with this software being resident in the keystation or workstation, such as workstations 82 shown in FIG. 10, such as a PC computer compatible 386 terminal.

TABLE C

```
/*Fast contact/monitor:

*Monitor: Exactly 4 alphanumerics with anything else round them.
*Contact:  4 letters + 2 letters (anything else surrounding)
*          4 letters + '*' + 1 letter
*          4 letters + '*' + space
*/
void MouseClick (WORD msg, POINT p)
{
    int xc, yc;
    int xleft;
    char buff[10];
    xc = CHAR_X(p.x);
    yc = CHAR_Y(p.y);
/*  printf("Mouse clicked at (%d, %d) chars (%d, %d)  n", p.x, p.y, xc, yc);*/
    if (0. = xc && xc PAGE_COLS && 0 = yc && yc <PAGE_ROWS)
    {
        for (xleft = xc; xleft > xc 6 && xleft > = 0; xleft--)
        {
            int i;
/*          printf("Consider >%.7s ... n", &Page[yc][xleft];*/
            if (isspace(Page[yc][xleft])) return;
            if(xleft -xc > 2 && !isalnum(Page[xc][xleft])) return;
            if (xleft >0 && isalnum(Page[xc][xleft - 1])) continue;  /* Keep moving backward*/
            /* The character to the left is not alnum.
             * Can we find a page code or address starting here
             */
            /* Check for fast contact */
            i = IsFastContact(&PAGE[yc][xleft], PAGE_COLS - xleft);
/*          printf("Returned %d  n", i);*/
            if (i != 0)
            {
                /* Do a fast contact! */
                int j;
                for (j = 0; j i; j++) buff[j] = Page[yc][xleft+j];
                buff[j] = 0;
/*              print("Fast contact >%s<  n", buff);*/
                CtrlSendPtrMessage (MOD_CONV, (msg == WM_LBUTTONDOWN)?
                DM_CLICKFN : DM_DBCLICKFN, 0,
buff, i+1);
                return;
            }
            i = IsFastMonitor(&Page[yc][xleft], PAGE_COLS - xleft);
/*          printf("Returned %d  n", i);*/
            if (i != 0)
            {
                /* Do a fast monitor! */
                int j;
                for (j = 0; j i; j++) buff[j] = Page[yc][xleft+j];
                buff[j] = 0;
/*              printf("Fast monitor >%s<  n", buff);*/
                CtrlSendPtrMessage (MOD_MONITOR, (msg == WM_LBUTTONDOWN)? DM_CLICKFN
: DM_DBLCLICKFN, 0, buff, i+1);
                return;
            }
        }
    }
}
/* This returns 0 if this is not a fast contact string otherwise the length (5 or 6) */
int IsFastContact (PSTR s, int len)
{
/*  printf("IsFastContact >%.*s<  n", len, s);*/
    if (len 5) return 0;
    unless (isalpha(s[0]) && isalpha(s[1]) && isalpha(s2]) && isalpha(s[3])) return 0;
    if (isalnum(s[4]))
```

TABLE C-continued

```
        {
                 if (len = = 5) return 5;
                 if (isalnum(s[5]))
                 {
                          if (len = = 6) return 6;
                          if (isalnum(s[6]11s[6] = = '*') return 0;
                          return 6;
                 }
                 if (s[5] = = '*') return 0;
                 return 5;
         }
         if (s[4] = = '*')
         {
         if (len = = 5) return 5;
         if (isalpha(s[5]))
         {
                  if (len = = 6) return 6;
                  if (isalpha(s[6])) return 0;
                  return 6;
                  }
                  if (isdigit(s[5] 11 s[5] = = '*') return 0;
                  return 5;
         }
         return 0;
}
int IsFastMonitor (PSTR s, int len)
}
/*       printf("IsFastMonitor > %. *s n", len, s);*/
         if(len 4) return 0;
         unless (isalnum(s[0] && isalnum(s[1]) && isalnum(s[2]) && isalnum(s[3])) return 0;
         if (len = = 4) return 4;
         if (isalnum(s[4])) return 0;
         return 4;
{
/*
 * Main message handling procedure
 *----------------------------------
 */
long EXPORTED DartConvWndProc (hWnd, message, wParam, lParam)
HWND hWnd;
WORD message;
WORD wParam;
LONG lParam;
{
         switch (message)
         {
                          caseWM_CREATE:
                                   ConvCreate(hWnd);
                                   break;
                          case WM_PAINT:
                                   ConvPaint(hWnd);
                                   break;
                          case WM_LBUTTONDOWN:
                                   TMActivateTile(LOWORD(CtrlGetHandle(TILE_PROMT, FALSE)));
                                   /* Mouse select conv */
                                   MouseSelectConv(MAKEPOINT(lParam));
                                   break;
                          case DM_CLICKFN:
                          {
                                   char line[INSERT_LINE];
                                   ExpandFastContact(LPSTR)lParam, line);
                                   SetLineMouseContact(line);
                          }
}
break;
case DM_DBLCLICKFN:
         InitiateMouseContact((LPSTR)lParam);
         break;
default:
         return (long) DefWindowProc (hWnd, message, wParam, lParam);
}
return (OL);
}
/*
 * Procedure to handle a mouse initiated contact
 *----------------------------------------------
 */
void InitiateMouseContact(string)
LPSTR string;
{
         char line[INSERT_LINE];
         ExpandFastContact(string, line);
         if (SetLineMouseContact(line))
```

TABLE C-continued

```
        {
                InitiateContactProc(line);
        }
}
/*
 * Procedure to setup the correct contact line
 *--------------------------------------------------
 */
BOOL SetLineMouseContact(line)
PSTR line;
{
    /* Check the state of the lock on the keyboard */
    if ((WORD)CtrlSendMessage(MOD_PROMPT, PM_KEYLOCK, ObtainPmptId(CmdConv), - L) = = CMIM
LOCKED) return FALSE;
    WriteRspString(CmdConv, NULL);
    LockData(0);
    CtrlSendPtrMessage(MOD_PROMPT, PM_SETTEXT, MAKEMODE(conv[0].PmptModeId, CNTCT_FN), line,
(strlen(line) + 1));
    UnlockData(0);
    /* Terminate any outstanding contacts and accepts that may be in progress */
    if (NextFreeConv→NextMesg = = CONTACT_MADE_ 11
    NextFreeConv→Next Mesg = = ACCEPT_SUCCEEDED)
    {
                TerminateCall(NextFreeConv);
    }
    return TRUE;
}
/*
 * Procedure to expand a fast contact line
 *--------------------------------------------------
 */
void ExpandFastContact(line, insrtline)
LPSTR line;
PSTR insrtline;
{
char intmesg[INTERESTBYTES + l];
int textlen = lstrlen(line);
int i = 0;
/* Find the first '*' in the string */
while ((i textlen) && (line[i] != '*'))
    {
                insrtline[i] = line[i];
                i + +;
        }
/* If a valid fast contact expansion */
if ((line[i] = = '*') && islanum(line[i + 1]))
{
    /* Load the predefined interest message if found, else ignore remainder of the flag since
not valid */
    If (LoadString(hConvInstance, (FAST_CONTACT + (line[i +1] - 'A')), intmes g, INTERESTBYTES
+ 1) != 0)
        {
                insertline[i + +] = ' ';
                MoveAsciiZ(&insrtline[i], intmesg, INSERT_LINE - i);
        }
        else
        {
                insrtline[i] = 0
        }
    }
    else insrtline[i] = 0;
}
STRINGTABLE
BEGIN
        FAST_CONTACT+ 0, "SPOT ATS PSE"
        FAST_CONTACT+ 1, "SPOT BEC PSE"
        FAST_CONTACT+ 2, "SPOT CHF PSE"
        FAST_CONTACT+ 3, "SPOT DEM PSE"
        FAST_CONTACT+ 4, "SPOT ESP PSE"
        FAST_CONTACT+ 5, "SPOT FFR PSE"
        FAST_CONTACT+ 6, "SPOT GBP PSE"
        FAST_CONTACT+ 7, "SPOT DKK PSE"
        FAST_CONTACT+ 8, "SPOT ITL PSE"
        FAST_CONTACT+ 9, "SPOT JPY PSE"
        FAST_CONTACT+ 10, "SPOT FIM PSE"
        FAST_CONTACT+ 11, "SPOT NOK PSE"
        FAST_CONTACT+ 12, "SPOT KWD PSE"
        FAST_CONTACT+ 13, "SPOT NLR PSE"
        FAST_CONTACT+ 14, "SPOT BEF PSE"
        FAST_CONTACT+ 15, "SPOT POE PSE"
        FAST_CONTACT+ 16, "SPOT IEP PSE"
        FAST_CONTACT+ 17, "SPOT CAD PSE"
```

TABLE C-continued

```
        FAST_CONTACT+ 18, "SPOT SEK PSE"
        FAST_CONTACT+ 19, "SPOT AUD PSE"
        FAST_CONTACT+ 20, "SPOT SAR PSE"
        FAST_CONTACT+ 21, "SPOT ZAR PSE"
        FAST_CONTACT+ 23, "SPOT XEU PSE"
        FAST_CONTACT+ 24, "SPOT SGD PSE"
        FAST_CONTACT+ 25, "SPOT HKD PSE"
END
```

It should be noted that as far as the system 30 is concerned, it makes no difference in the system 30 to the signal sent from the command line whether that signal is manually input on the keyboard or results from the aforementioned click on contact using the mouse 200 or other screen pointer device.

Figure 11:
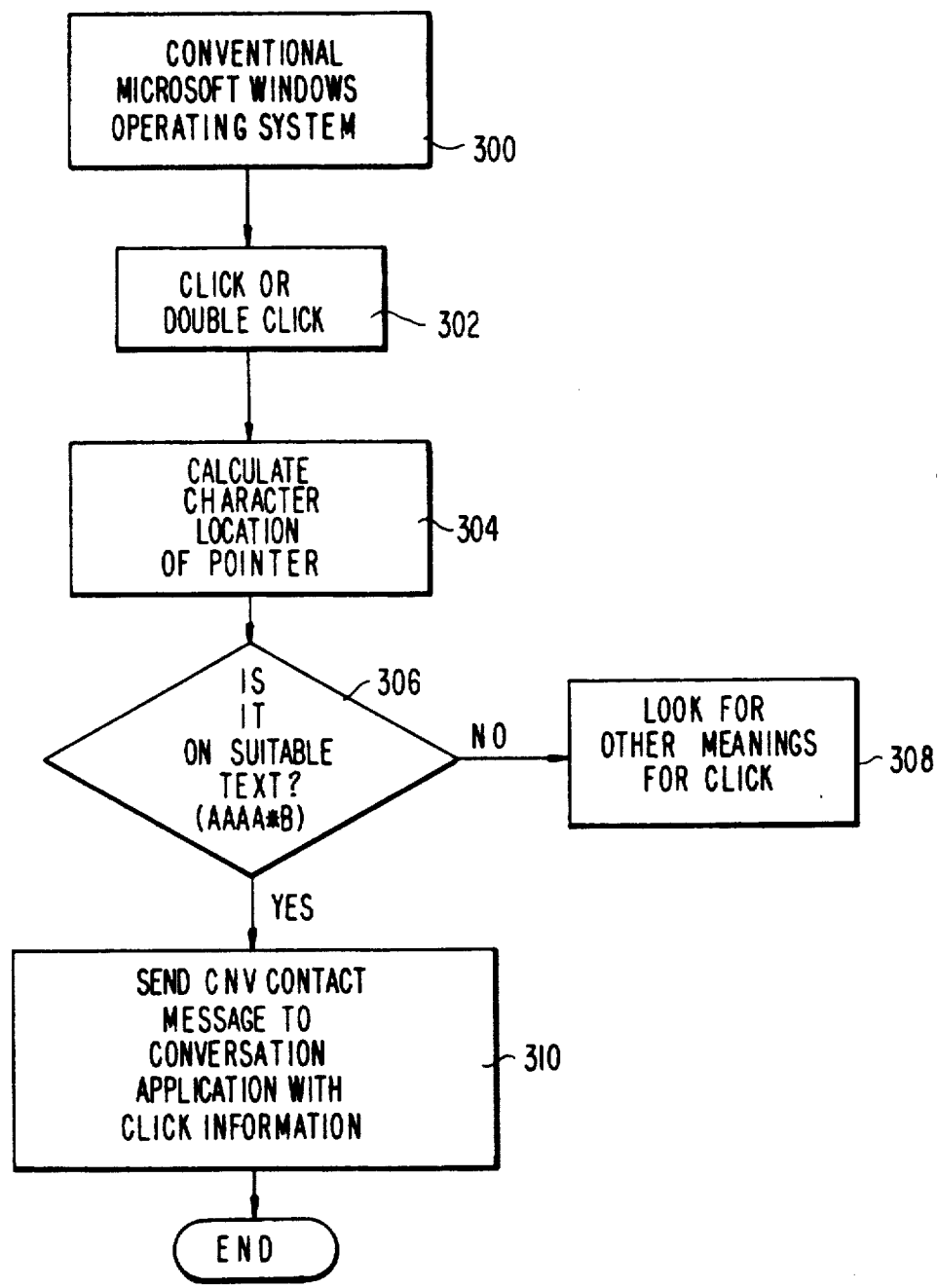
FIG. 11 is a logic flow diagram of the data display application for initiating a conversational contact message using the screen pointer in accordance with the present invention.

Referring now to the logic flow diagrams of FIGS. 11 and 12, these diagrams illustrate the software of TABLE C, with FIG. 11 being directed to the data display application which provides the CNV CNTCT message to the conversation application processing of FIG. 12 which ultimately results in initiating conversation contact with the called party based on the double click of the mouse 200 as will be described hereinafter. Referring to FIG. 11, the displayed page which preferably contains the unique subscriber identification code as well as financial data in a windowed display, assuming by way of example that Microsoft Windows is employed, is shown. The conventional Microsoft Windows Operating System is represented in FIG. 11 by reference numeral 300. The windowing system such as Microsoft Windows, preferably conventionally receives information of whether a click or a double click has taken place in the window that this application is controlling. This information typically identifies where the cursor was in the window when the mouse 200 was clicked, and whether there was a single click or a double click, such as represented by reference numeral 302 in FIG. 11. Microsoft Windows conventionally calculates the character location of the pointer, such as represented by reference numeral 304 in FIG. 11, such as by determining the pixel location of the pointer and converting it to character location in the display. The system 30 of the present invention then preferably searches in the vicinity of the pointer to see if the character string or text which the pointer is on is in suitable form for a fast contact, such as the four characters followed by a asterisk or four characters followed by an asterisk followed by a fifth character as previously described in the above examples. This is represented by reference numeral 306 in FIG. 11. If the windowed display is not in Proper format, then this application looks for other possible meanings, such as represented by reference numeral 308 in FIG. 11. If the windowed display is in the proper format for a fast contact, then a CNV CNTCT message is sent to the conversation application of FIG. 12 and inserted in the command line. This is represented by reference numeral 310 in FIG. 11. Thus, the data display application of FIG. 11 has indicated a potential contact and the data display application of FIG. 11 can go on to other functions while the conversation application processing of the received CNV CNTCT message 312 in accordance with FIG. 12 occurs. The conversation application of FIG. 12 in accordance with the conventional Window Operating System is waiting to receive messages from various potential message sources including the data displaY application of FIG. 11. It then receives the message and extracts the information from the message of the type of message 314 and does a switch-on to execute the code appropriate the type of message 316. If it finds the conversation start message type, it looks in this message for the text it is being suPplied with and, if there is a character after the asterisk, expands the interest message code 318 to insert an interest message in the command line 320 and sets up the subscriber terminal for making a contact. The system 30 is preferably designed so as to automatically initiate the contact 322 if there is a double click, and to put the message in the command line without initiating contact if there was a single click, in which instance the user manually presses the TRANSMIT key to initiate the contact. This determination of single click or double click is represented by reference numeral 324 in FIG. 12. Thus, if there is a double click, it is assumed that an actual contact is desired and the system 30 effectively simulates the pressing of the TRANSMIT key, such as represented by FIGS. 6B or 9B. The operation of the system 30 thereafter is the same whether the data had been entered manually or as a result of the aforementioned double click. Of course, if the user wanted to see the interest message, for example, before transmitting it, he could single click the mouse 200 and, then, if he did not want to manually press TRANSMIT on the keyboard, he could again double click the mouse 200 automatically initiating the conversational contact and transmit the interest message to the called party.

Thus, the improved system 30 of the present invention enables both fast contact using a screen pointer as well as contact using the keyboard to provide a plurality of approaches to meet all circumstances in a rapidly paced environment, such as the foreign exchange market.

What is claimed is:

1. In a video communication network capable of providing textual data messages to a plurality of subscriber terminals throughout said video communication network, at least a portion of said plurality of subscriber terminals comprising subscriber keystations, each of said subscriber keystations comprising a video display means for providing a windowed textual video display of data input to said video communication network, at least one of said subscriber keystations further comprising pointer means for locating data display areas in said windowed textual video display; the improvement comprising at least one message switching interface means for routing video conversational textual data messages throughout said video communication network, a plurality of said subscriber keystations being operatively connected to said at least one message switching interface means, said at least one message switching interface means comprising message routing logic means for providing message routing logic control signals and further comprising display control logic means and local video display storage means for locally storing video conversational textual data for providing a video display thereof to at least a pair of said subscriber keystations which are operatively connected together through said at least one message switching interface means in a completed call in said video communication network, at least said one of said subscriber keystations comprising keystation storage means for retrievably storing a plurality of unique subscriber keystation contact signals capable of initiating conversational contact with at least one other subscriber keystation in said video communication network, each of said subscriber keystations having a unique associated subscriber designator, said subscriber keystation contact signals corresponding to said unique associated subscriber designators, said keystation storage means further comprising means for retrievably storing a plurality of unique display messages, each of said unique display messages having a unique associated message designator corresponding thereto, said windowed textual video display comprising a windowed display of at least one of said unique associated subscriber designators and said unique associated message designators, said pointer means comprising means capable of locating said windowed display of said unique associated subscriber designator and said unique associated message designator in said windowed textual video display and providing a conversational contact message signal to said keystation storage means in response thereto for retrieving said unique subscriber keystation contact signal corresponding to said located unique associated subscriber designator for providing a calling signal to a called subscriber keystation, said called subscriber keystation comprising said subscriber keystation corresponding to said located unique associated subscriber designator through said message routing logic means for automatically initiating conversational contact therewith, said keystation storage means further comprising means responsive to said conversational contact message signal for retrieving said corresponding unique display message corresponding to said located unique associated message designator for providing said unique display message to said called subscriber keystation corresponding to said located unique associated subscriber designator along with said calling signal for providing a textual video display of said retrieved display message at said called subscriber keystation when said conversational contact has been automatically initiated; whereby said pointer means may provide fast contact and message display for automatically initiating textual data display at a contacted subscriber keystation.

2. A video conversational communication network in accordance with claim 1 wherein said retrievably stored plurality of unique identifiable display messages comprises a plurality of unique interest messages each corresponding to a unique interest message code, said unique interest message code comprising said unique associated message designator, said windowed display comprising a windowed display of a selected one of said unique interest message codes along with said subscriber designator, said keystation storage means responsive to said conversational contact message signal for retrieving said unique display message corresponding to said unique associated message designator comprising means for retrieving said unique interest message corresponding to said unique interest message code for providing said interest message to said called subscriber keystation along with said calling signal for providing a textual video display of said interest message at said called subscriber keystation with which said conversational contact has been automatically initiated.

3. A video conversational communication network in accordance with claim 2 wherein said windowed textual video display comprises financial data, said interest messages comprising trading messages corresponding to said financial data display.

4. A video conversation communication network in accordance with claim 3 wherein said pointer means comprises a mouse means.

5. A video conversation communication network in accordance with claim 2 wherein said pointer means comprises a mouse means.

6. A video conversation communication network in accordance with claim 1 wherein said windowed textual video display comprises financial data, said display messages comprising trading messages corresponding to said financial data.

7. A video conversation communication network in accordance with claim 6 wherein said pointer means comprises a mouse means.

8. A video conversation communication network in accordance with claim 1 wherein said pointer means comprises a mouse means.

9. A video conversation communication network in accordance with claim 1 wherein each of said subscriber keystations further comprises keyboard means for operator input of textual data messages and associated data control signals via said keyboard means, said video display means providing a video display of keyboard generated data input to the video communication network, said keyboard means comprising means for alternatively providing a unique calling signal along with said unique display message to at least one message switching interface means for initiating a call to a designated subscriber keystation in said plurality of keystations in said video communication network, said at least one message switching interface means further comprising means for receiving said alternatively provided unique calling signal provided thereto along with said unique display message for completing a call to said designated subscriber keystation for providing said textual video display of said retrieved display message at said designated subscriber keystation when said call has been completed, said message routing logic means comprising means for controlling routing of said alternatively provided unique calling signal to said designated subscriber keystation to control the completion of said initiated call, said at least one message switching interface means display control logic means comprising means for providing on said pair of connected subscriber keystation video display means a video display of video conversational textual data transmitted between said connected subscriber keystations in said video communication network with which said initiated call is completed.

10. A video conversational communication network in accordance with claim 9 wherein said pointer means comprises a multi-mode pointer means in which said unique associated display message is retrieved and displayed on said subscriber keystation initiating said call prior to automatically initiating said call in a first mode, and is transmitted to said called subscriber keystation along with said calling signal in a second mode; whereby said unique associated display message may be previewed prior to automatically initiating said call to said called subscriber keystation.

11. A video conversational communication network in accordance with claim 10 wherein said keyboard means further comprises means for providing said calling signal along with said unique associated display message to said called subscriber keystation after previewing said unique associated display message in said first mode of said pointer means.

12. A video conversational communication network in accordance with claim 1 wherein said windowed textual data display comprises financial data, said video communication network comprising a trading network related to said financial data, said subscriber designators being embedded in said financial data display.

13. A video conversational communication network in accordance with claim 12 wherein said pointer means comprises a mouse means.

14. A video conversational communication network in accordance with claim 1 wherein said pointer means comprises a multi-mode pointer means in which said unique associated display message is retrieved and displayed on said subscriber keystation initiating said call prior to automatically initiating said call in a first mode, and is transmitted to said called subscriber keystation along with said calling signal in a second mode; whereby said unique associated display message may be previewed prior to automatically initiating said call to said called subscriber keystation.

15. A video conversational communication network in accordance with claim 14 wherein said pointer means comprises a double click mouse means, said first mode being initiated by a first click of said mouse means and said second mode being initiated by a second click of said mouse means.

16. In a video communication network capable of providing textual data messages to a plurality of subscriber terminals throughout said video communication network, at least a portion of said plurality of subscriber terminals comprising subscriber keystations, each of said subscriber keystations comprising a video display means for providing a windowed textual video display of data input to said video communication network, at least one of said subscriber keystations further comprising pointer means for locating data display areas in said windowed textual video display; the improvement comprising at least one message switching interface means for routing video conversational textual data messages throughout said video communication network, a plurality of said subscriber keystations being operatively connected to said at least one message switching interface means, said at least one message switching interface means comprising message routing logic means for providing message routing logic control signals and further comprising display control logic means and local video display storage means for locally storing video conversational textual data for providing a video display thereof to at least a pair of said subscriber keystations which are operatively connected together through said at least one message switching means in a completed call in said video communication network, at least said one of said subscriber keystations comprising keystation storage means for retrievably storing a plurality of unique subscriber keystation contact signals capable of initiating conversational contact with at least one other subscriber keystation in said video communication network, each of said subscriber keystations having a unique associated subscriber designator, said subscriber keystation contact signals corresponding to said unique associated subscriber designators, said keystation storage means further comprising means for at least temporarily storing a display message at said subscriber keystation, said windowed textual video display comprising a windowed display of at least one of said unique associated subscriber designators and said display message, said pointer means comprising means capable of locating said windowed display of said unique associated subscriber designator and said display message in said windowed textual video display and providing a conversational contact message signal to said keystation storage means in response thereto for retrieving said unique subscriber keystation contact signal corresponding to said located unique associated subscriber designator for providing a calling signal to said corresponding subscriber keystation through said message routing logic means for automatically initiating conversational contact therewith, said keystation storage means further comprising means responsive to said pointer means for providing said display message to said subscriber keystation corresponding to said located unique associated subscriber designator along with said calling signal for providing a textual video display of said display message at said called subscriber keystation when said conversational contact has been automatically initiated; whereby said pointer means may provide fast contact and message display at a contacted subscriber keystation.

17. A video conversation communication network in accordance with claim 16 wherein said pointer means comprises a mouse means.

18. A video conversation communication network in accordance with claim 16 wherein said display message is a conversational textual video display related to said conversational contact.

19. A video conversation communication network in accordance with claim 18 wherein said pointer means comprises a mouse means.

20. A video conversation communication network in accordance with claim 18 wherein said display message comprises an interest message.

21. A video conversation communication network in accordance with claim 20 wherein said windowed textual video display comprises financial data, said interest message comprising a trading message corresponding to said financial data display.

* * * * *

UNITED STATES PATENT AND TRADEMARK OFFICE
CERTIFICATE OF CORRECTION

PATENT NO. : 5,034,916
DATED : July 23, 1991
INVENTOR(S) : CHRISTOPHER J. ORDISH It is certified that error appears in the above-identified patent and that said Letters Patent is hereby corrected as shown below:

Column 2, line 5:  Change "multiPle to --multiple--.

Column 2, line 5:  Change "uses" to --users--.

Column 2, line 24:  Change "4,531184" to --4,531,184--.

Column 2, line 34:  Change "Providing" to --providing--.

Column 3, line 1:  Change "apprOaCh uSing" to --approach using--.

Column 4, line 15:  Change "tYPical" to --typical--.

Column 4, line 52:  Change "Pointer" to --pointer--.

Column 4, line 68:  Change "ar" to --are--.

Column 5, line 1:  Delete " e " at the beginning of the line.

Column 6, line 2:  Change "o" to --on--.

Column 6, line 25:  Change "Previously" to --previously--.

Column 8, line 55:  Change "o" to --on--.

Column 9, line 8:  Change "consists" to --consist--.

Column 10, line 38:  Change "o" to --or--.

Column 11, line 10:  At the end of line 10 after "if", insert --there is room in the called subscriber's queue and that the--.

UNITED STATES PATENT AND TRADEMARK OFFICE
CERTIFICATE OF CORRECTION

PATENT NO. : 5,034,916
DATED : July 23, 1991
INVENTOR(S) : CHRISTOPHER J. ORDISH Page 2 of 3

It is certified that error appears in the above-identified patent and that said Letters Patent is hereby corrected as shown below:

Column 11, line 68: Change "bY" to --by--.

Column 12, line 6: Change "w 11" to --will--.

Column 12, line 7: Change "con act" to --contact--.

Column 12, line 14: Change "storage" to --page--.

Column 13, line 13: Change "occurs" to --occur--.

Column 13-14, line 30: Change " n"," to --\n",--.

Column 13-14, line 36: Change " n"," to --\n",--.

Column 13-14, line 45: Change " n"," to --\n",--.

Column 13-14, line 52: Change " n"," to --\n",--.

Column 13-14, line 59: Change " n"," to --\n",--.

Column 13-14, line 66: Change " n"," to --\n",--.

Column 13-14, line 77: Change " n"," to --\n",--.

Column 13-14, line 79: Change "isalpha(s2])" to --isalpha(s[2])--.

Column 14, line 8: Change "softward" to --software--.

Column 14, line 12-13: Change "workstations" to --workstation--.

UNITED STATES PATENT AND TRADEMARK OFFICE
CERTIFICATE OF CORRECTION

PATENT NO. : 5,034,916

DATED : July 23, 1991

INVENTOR(S) : CHRISTOPHER J. ORDISH

Page 3 of 3

It is certified that error appears in the above-identified patent and that said Letters Patent is hereby corrected as shown below:

Column 19, line 51: Change "Proper" to --proper--.

Column 19, line 66: Change "displaY" to --display--.

Column 20, line 14: Change "appropriate the type" to --appropriate to the type--.

Column 20, line 16: Change "suPplied" to --supplied--.

Signed and Sealed this

Second Day of March, 1993

*Attest:*

STEPHEN G. KUNIN

*Attesting Officer*   *Acting Commissioner of Patents and Trademarks*